United States Patent
Hoa et al.

(10) Patent No.: US 6,282,541 B1
(45) Date of Patent: Aug. 28, 2001

(54) EFFICIENT GROUPBY AGGREGATION IN TOURNAMENT TREE SORT

(75) Inventors: Peter Hoa, Los Altos; Balakrishna Raghavendra Iyer, San Jose; Beth Rivenes Moore; Bryan Frederick Smith, both of Morgan Hill, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/123,840

(22) Filed: Jul. 27, 1998

Related U.S. Application Data

(60) Provisional application No. 60/053,880, filed on Jul. 28, 1997.

(51) Int. Cl.[7] .................................................. G06F 17/00
(52) U.S. Cl. ......................... 707/7; 707/6; 707/2; 707/3; 707/4; 707/5; 707/101; 707/102; 707/200
(58) Field of Search ............................ 707/2, 3, 4, 5–6, 707/101, 102, 200, 7

(56) References Cited

U.S. PATENT DOCUMENTS

| 5,287,494 | * | 2/1994 | Garcia et al. | 707/1 |
| 5,619,693 | * | 4/1997 | Troisi | 707/7 |
| 5,619,713 | * | 4/1997 | Baum et al. | 707/102 |

* cited by examiner

Primary Examiner—Thomas Black
Assistant Examiner—Diane D. Mizrahi
(74) Attorney, Agent, or Firm—Janaki Komanduri; Ingrid M. Foerster

(57) ABSTRACT

A method, apparatus, and article of manufacture for a computer implemented groupby aggregation system. Groupby aggregation is performed when a statement is executed in a database stored on a data storage device, which is connected to a computer. Initially, data elements are input into a tournament tree from an input sequence. Then, a winner of a tournament in the tournament tree is identified. The winner is recycled into the tournament tree.

30 Claims, 32 Drawing Sheets

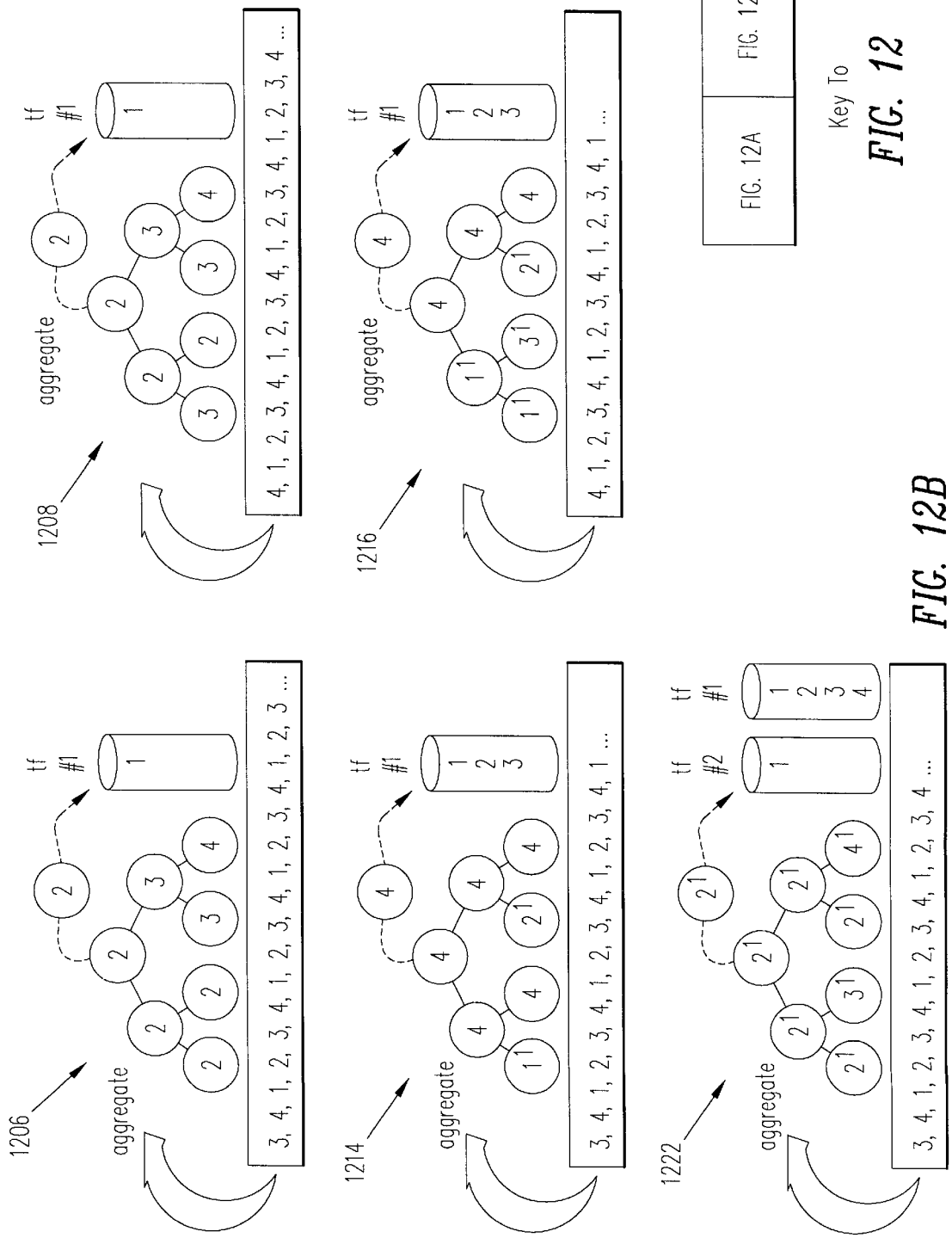

Prev: Winner: None
　　　　1
　　1　　　1
1　2　1　3　　← 1500
W

Prev: Winner: 1
　　　　1
　　2　　　1
3　2　1　3　　← 1502
　　　W

Prev: Winner: 1
　　　　2
　　2　　　3
3　2　3　3　　← 1504
　W

Partial Run written to temp data set: 1,
Prev: Winner: 2
　　　　3
　　3　　　3
3　n1　3　3　← 1506
W

*FIG. 15*

Previous Winner: 1

```
            2
        3       2                          1606
      4   3   2   4                      ←
    4 5 3 4 2 5 4 5
            W
```

Partial Run written to temp data set: 1,
Previous Winner: 2

Prev: Winner: None

```
        1
    1       1
1   2   1   3
W
```
← 1800

Prev: Winner: 1

```
        1
    2       1
3   2   1   3
        W
```
← 1802

Prev: Winner: 1

Prev: Winner: 2
          3
     3         3
3   n1   3    3
W
                                    ← 1806

Prev: Winner: 3
          3
    n1         3
n2  n1   3    3
         W
                                    ← 1808

Prev: Winner: 3
          3
    n1         3
n2  n1   n1   3
              W
                                    ← 1810

*FIG. 18B*

Prev: Winner: –

```
        1
    1       3
  1   2   3   4
  W
```
← 1900

Prev: Winner: 1

Prev: Winner: 2
```
           3
     5           3
5   n1    3     4
           W
```
← 1904

Prev: Winner: 3
```
           4
     5           4
5   n1   n2     4
                W
```
← 1906

Prev: Winner: 4
```
           5
     5          n2
5   n1   n2    n3
W
```
← 1908

*FIG. 19B*

Prev: Winner: 5

```
         n1
     n1      n2
  n4  n1  n2  n3
         W
```
← 1910

Partial Run written to temp data set: < 1,
Prev: Winner: n1

EFFICIENT GROUPBY AGGREGATION IN TOURNAMENT TREE SORT

PROVISIONAL APPLICATION

This application claims the benefit of U.S. Provisional Application No. 60/053,880, entitled "Efficient Groupby Aggregation in Tournament Tree Sort," filed on Jul. 28, 1997, by Peter Hoa, et al., which is incorporated by reference herein.

BACKGROUND OF THE INVENTION

1. Field of the Invention

This invention relates in general to computer-implemented database systems, and, in particular, to efficient groupby aggregation in tournament tree sort.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

An example query, typical of many decision support database applications, expressed in SQL is:

SELECT DEPT, AVG(SALARY) FROM EMP GROUPBY DEPT

To execute the above SELECT query, the RDBMS may sort records by DEPT and compute the SALARY averages for the group of records for each DEPT. In particular, when sorting a large number of rows, there may be many parallel sorts occurring separately. These sorts may be responding to the same or different queries. Each sort takes up system resources. In particular, each sort reads a number of records, sorts these records, and places the sorted records into a temporary data set. For a large number of records, there could be many temporary data sets, which may take up the entire memory, even before the sorting is completed.

It has been suggested that special treatment be given to aggregation in a RDBMS in A. Klug, "Access Path in the Abell Statistical Query Facility", Proc. ACM SIGMOD, 1982, pp. 161–172, which is incorporated by reference herein. One technique, not suggested in the Klug article, but suggested in D. J. Haderle and E. J. Lynch, "Evaluation of Column Function on Grouped Data During Data Ordering", IBM Technical Disclosure Bulletin, 10, March 1990, p385–386, which is incorporated by reference herein, is to perform the operations related to the aggregation within a sort.

One problem pertains to doing aggregation within a sort using a tournament tree. A tournament tree is a binary tree that has been a favored sort technique because it is based on a technique called replacement/selection, which generates sort runs that are typically twice the size of main memory devoted to the sort, thereby possibly reducing the merge activity. The tournament tree sort is also favored because special hardware assists are known to speed up tournament tree sorts.

In one technique for aggregation within a sort, known as "aggregation push-down into sort", consecutive winners (e.g., for data elements, such as keys, a wilmer may be the data element having the lowest value) of tournaments are compared, and, if the winners are identical, the aggregation operations (e.g., sums and counts) are accumulated for these two keys. The technique proceeds recursively, with the key of the aggregate being the key against which the next winner is compared. A group break is detected when a non-matching key emerges as the new winner. Then, a new group begins, with the initialization of a new accumulator and count variables. This approach is referred to as "winner aggregation".

The problem with the winner aggregation approach is that several runs of different groups could be formed, even if the number of groups is less than the number of leaf nodes in the tournament tree. Once runs are formed, each run has to be inserted into a separate, temporary data set and fetched later for merging, thus causing CPU overhead. Temporary data sets occupy main memory, and when their memory requirements exceed memory, they cause input/output (I/O) interruptions.

Therefore, there is a need in the art for an improved technique for groupby aggregation in tournament tree sort.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented groupby aggregation system.

In accordance with the present invention, groupby aggregation is performed when a statement is executed in a database stored on a data storage device, which is connected to a computer. Initially, data elements are input into a tournament tree from an input sequence. Then, a winner of a tournament in the tournament tree is identified. The winner is recycled into the tournament tree.

An object of the invention is to provide a technique for efficient groupby aggregation in a tournament tree sort. Another object of the invention is to minimize the need to write data to temporary data sets.

BRIEF DESCRIPTION OF THE DRAWINGS

Referring now to the drawings in which like reference numbers represent corresponding parts throughout:

FIG. 15 is a diagram illustrating an example of winner aggregation;

FIGS. 16A–16B are diagrams illustrating an example of early aggregation;

FIGS. 18A–18B are diagrams illustrating the key recycling technique for the same input sequence as was used in the example for winner aggregation;

FIGS. 19A–19C are diagrams illustrating aggregation within a tournament tree;

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
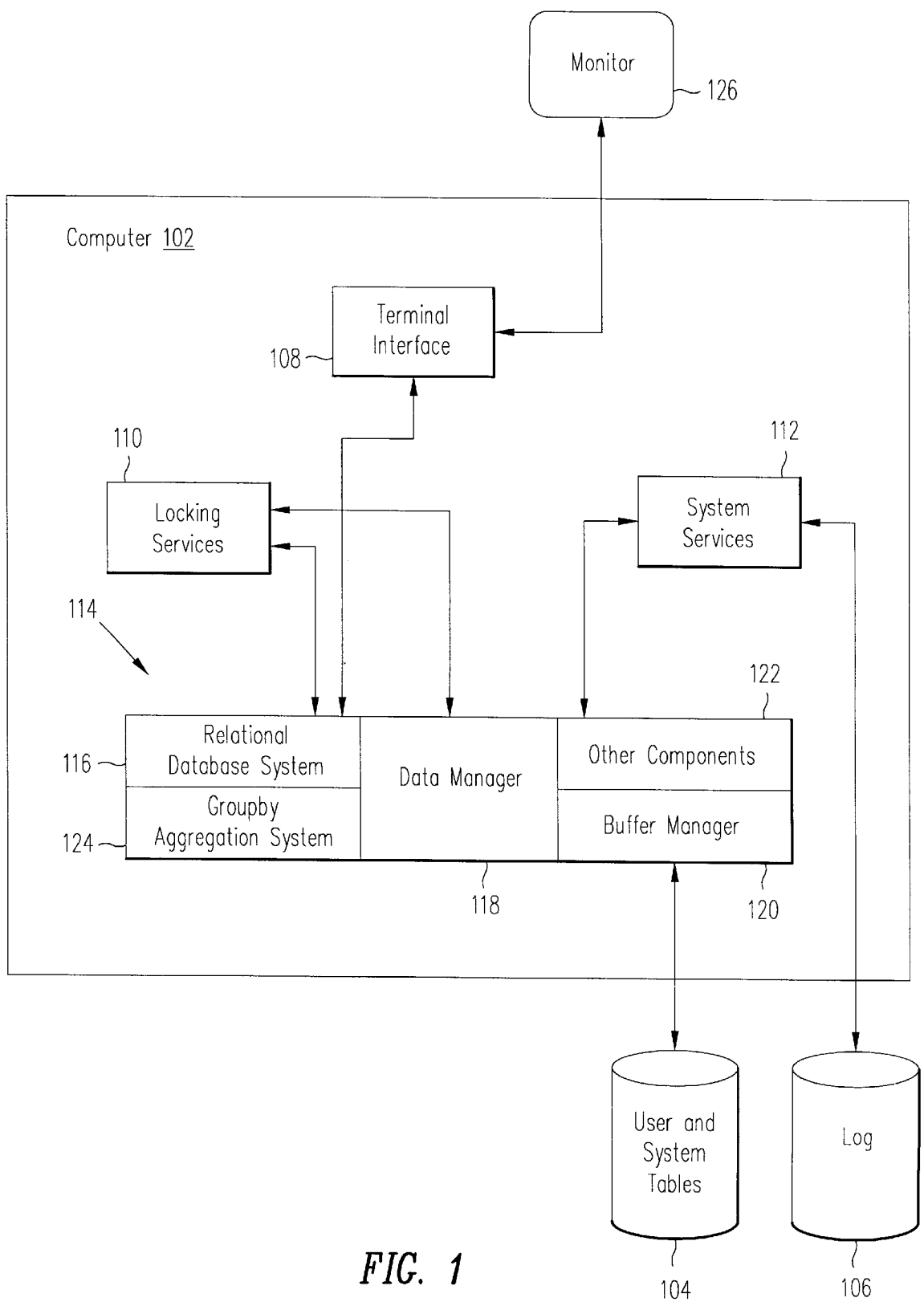
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

In the preferred embodiment of the present invention, the RDBMS software comprises the DB2® product offered by IBM for the MVS® or OS/390® operating systems. Those skilled in the art will recognize, however, that the present invention has application program to any RDBMS software, whether or not the RDBMS software uses SQL.

As illustrated in FIG. 1, the DB2® system for the MVS® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Groupby Aggregation System 124, and other components 122 such as an SQI, compiler/interpreter. These submodules support the functions of the SQL language, i.e. definition, access control, interpretation, compilation, database retrieval, and update of user and system data. The Groupby Aggregation System 124 works in conjunction with the other submodules.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Efficient Groupby Aggregation In Tournament Tree Sort

The groupby aggregation system 124 of the present invention provides an efficient technique for processing aggregations within sorts. In particular, the groupby aggregation system 124 uses key recycling for grouping records using column function processing. Additionally, if the cardinality of groups is very low, then the groupby aggregation system 124 uses incore storage as "buckets" to hold the aggregation of the column functions as the group by processing takes place.

The central idea of key recycling is that a key that has emerged from the tournament tree must not be lost from the tournament tree. Therefore, the key is reinserted into the tree, with a marker indicating that the key must remain in the tree until the next sequence starts. When the key is re-inserted, the key brings along with it, any counts, sums, etc. These fields are referred to as aggregate fields.

The groupby aggregation system 124 can detect conditions for key recycling termination based on two techniques. In one technique, key recycling is terminated when the number of distinct keys is greater than the number of leaf nodes in the tournament tree. In particular, the groupby aggregation system 124 counts distinct key values emerging out of the tournament tree, when the emerging keys are in ascending sequence. If the number of distinct keys in the sequence exceeds the number of nodes in the tournament tree, the groupby aggregation system 124 determines that there are more distinct keys than nodes in the tournament tree and that all subsequent winners are to be spilled over to temporary data sets, rather than inserted back into the tournament tree. In another technique, the number of aggregations between successive rounds of recycling are counted. If the count of the number of aggregations falls below a certain threshold, then the key recycling is terminated.

Illustrative examples, covering both the case in which the number of distinct keys is smaller than the number of tournament tree leaf nodes and the case in which there are more distinct keys than tournament tree leaf nodes, are given below.

For grouping records using column function processing, if the cardinality of groups is very low, then incore storage can be used as "buckets" to hold the aggregation of the column functions as the group by processing takes place. The bucket sort technique is used as input records are read into the sort. As keys are read in, they are compared with existing keys already in the buckets. If there is a duplicate, then the key is aggregated with the key in the bucket. The resulting key, along with any accumulators and count fields that hold partial aggregation results for this key are now contained in the bucket. These fields are also referred to as aggregate fields.

This continues until the groupby aggregation system 124 hits a threshold for the optimal number of buckets for the sort or until all of the records are read into the buckets. When all keys are read into the buckets, they are sorted and output. However, if the number of buckets is high, but no aggregation is taking place, then the bucket sort ceases and key recycling takes over.

In the database application, except for very special cases, it is not possible to predict prior to picking the execution technique for the query, whether the number of distinct keys is larger than the number of tree leaf nodes. Only techniques that work for both cases are generally applicable to RDBMSs. The technique of the present invention works for both cases.

Tournament Tree Groupby Sort Overview

A tournament tree sort has two phases: an input phase and a merge phase. During the input phase, data is input into a tournament tree and winners of the tournament are stored in temporary data sets. During the merge phase, the temporary data sets are merged into an output file.

Figure 2:
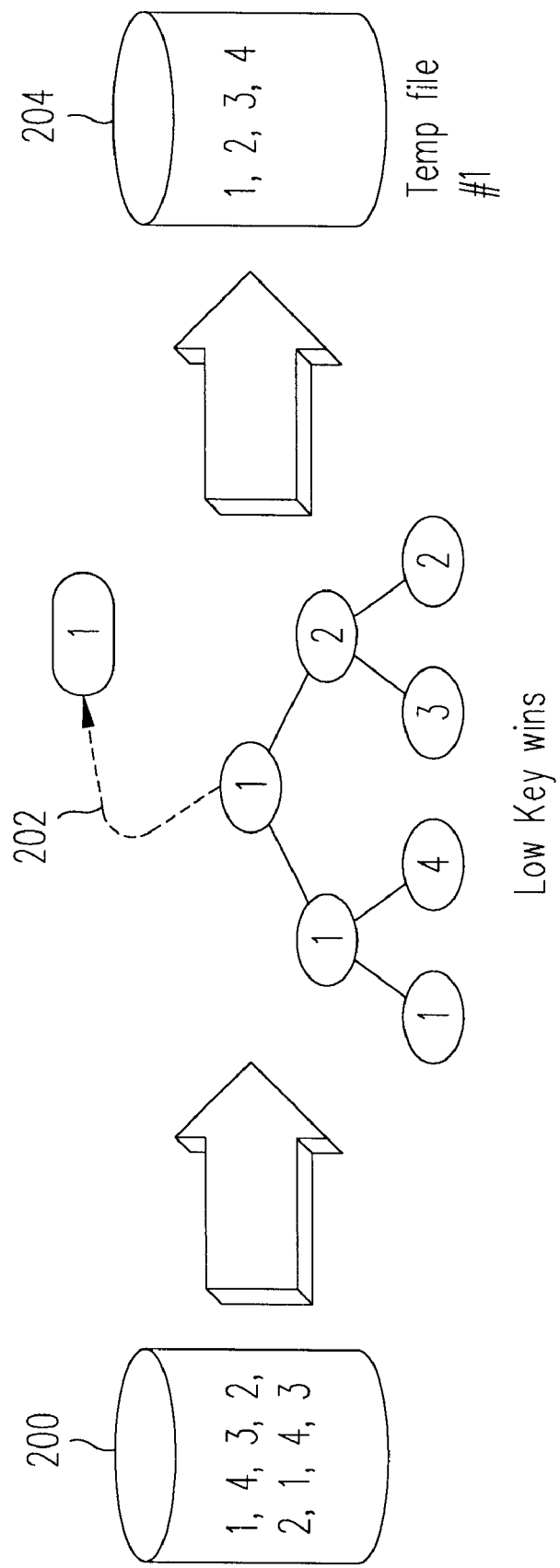
FIG. 2 is a diagram illustrating the input phase of a tournament tree sort.

FIG. 2 is a diagram illustrating the input phase of a tournament tree sort. A database 200 contains keys, with the input sequence of: 1, 4, 3, 2, 2, 1, 4, 3. Using the input sequence, a tournament tree 202 is populated with unsorted keys. In particular, in the example illustrated, the tournament tree has four leaves. These four leaves are initially populated with the first four keys of the input sequence, which are 1, 4, 3, 2. Then, each pair are compared to obtain a winner for the level above the leaf nodes. This continues with parent nodes being populated with the winner of a tournament between child nodes. Winners of the tournament are stored in a temporary data set 204. Then, the leaf node holding the key for the winner is replaced with the next key in the input sequence. This continues until the input sequence is exhausted.

Figure 3:
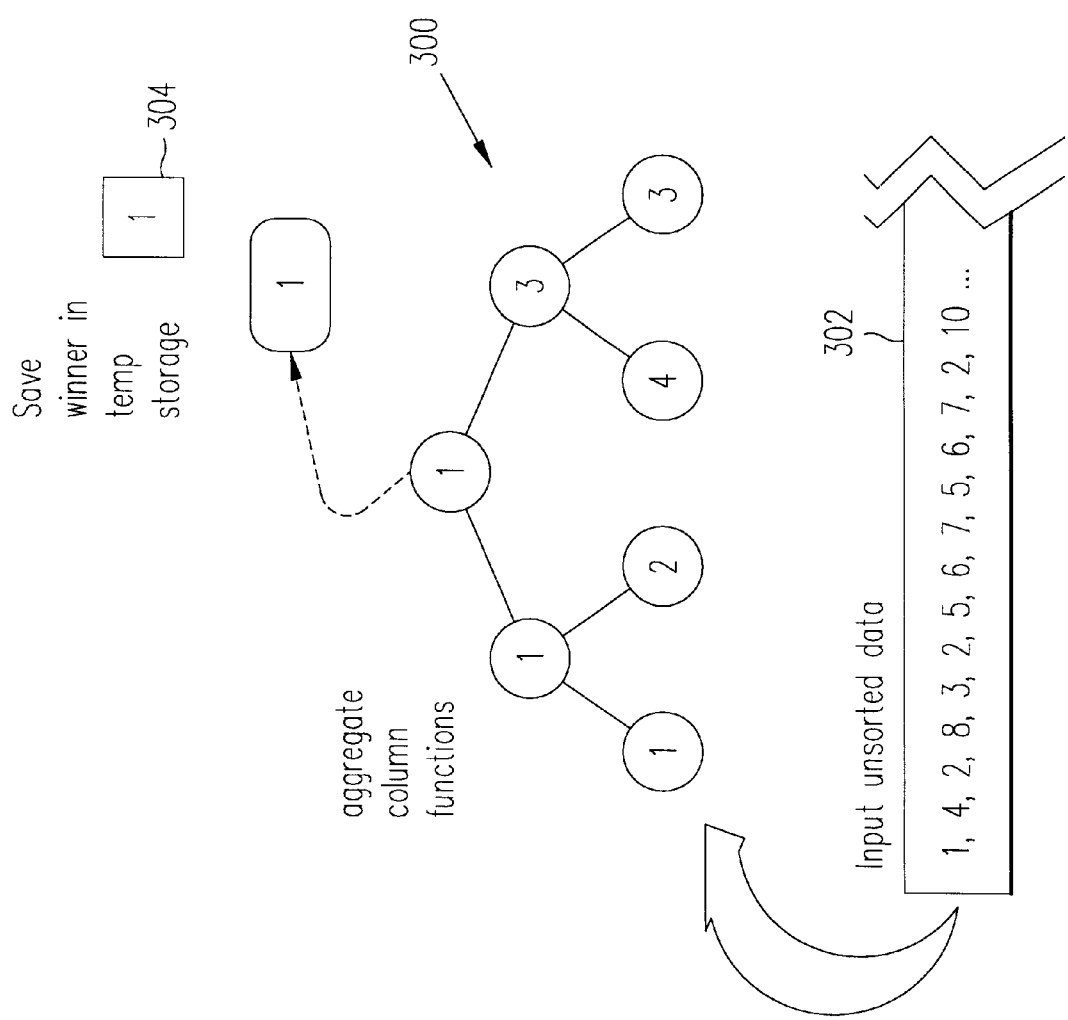
FIG. 3 is a diagram illustrating data being input into a tournament tree.

FIGS. 3–6 are diagrams illustrating the input phase in more detail. FIG. 3 is a diagram illustrating data being input into a tournament tree 300. The input sequence 302 contains unsorted data. The unsorted data are input to the tournament tree 300. Winners of the tournament are stored in temporary storage 304.

Figure 4:
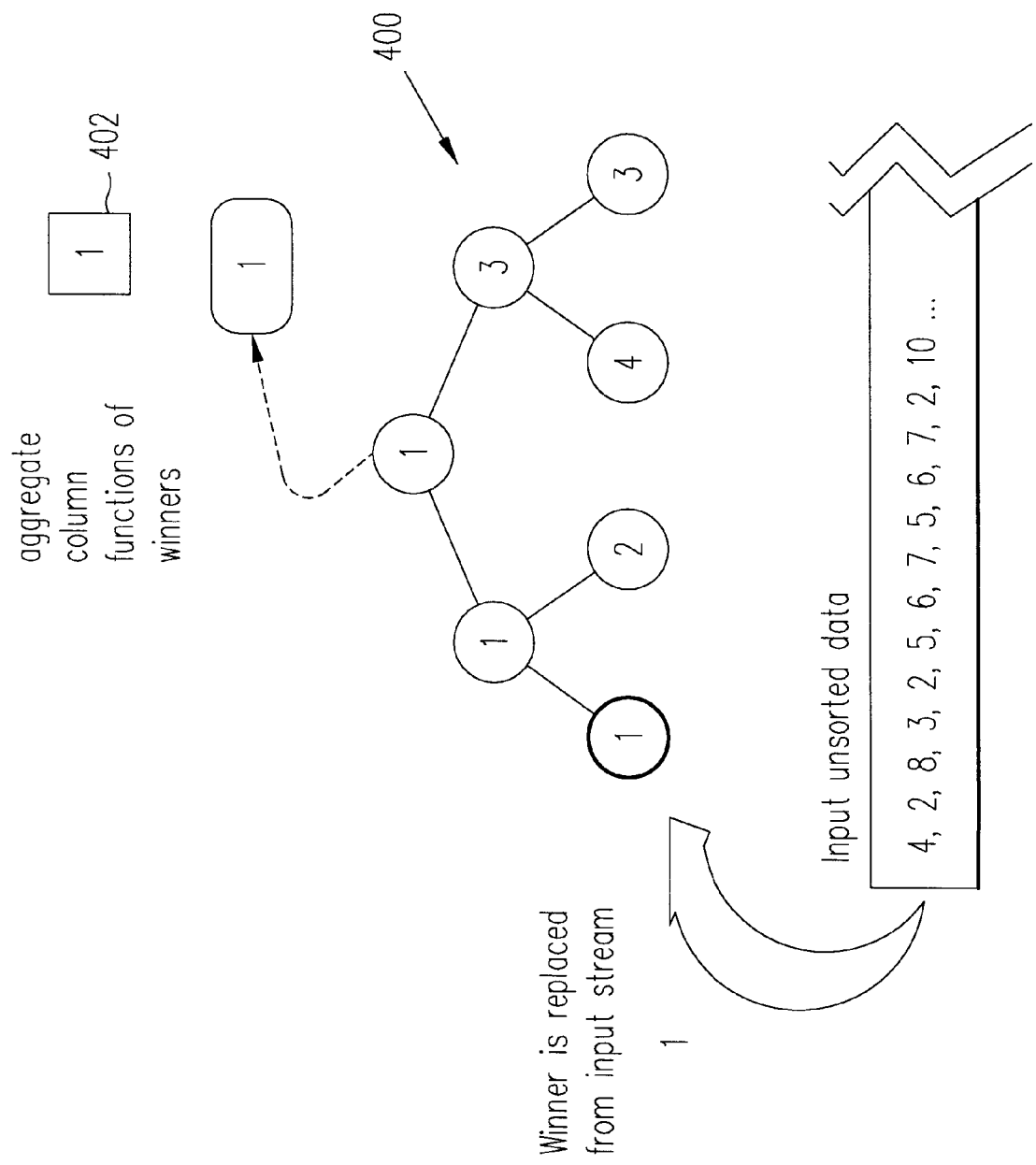
FIG. 4 is a diagram illustrating winner aggregation with a tournament tree.

FIG. 4 is a diagram illustrating winner aggregation with a tournament tree 400. Consecutive winners 402 of tournaments are compared. If these winners are identical, aggregate column functions are applied (e.g., sums or counts are accumulated).

Figure 5:
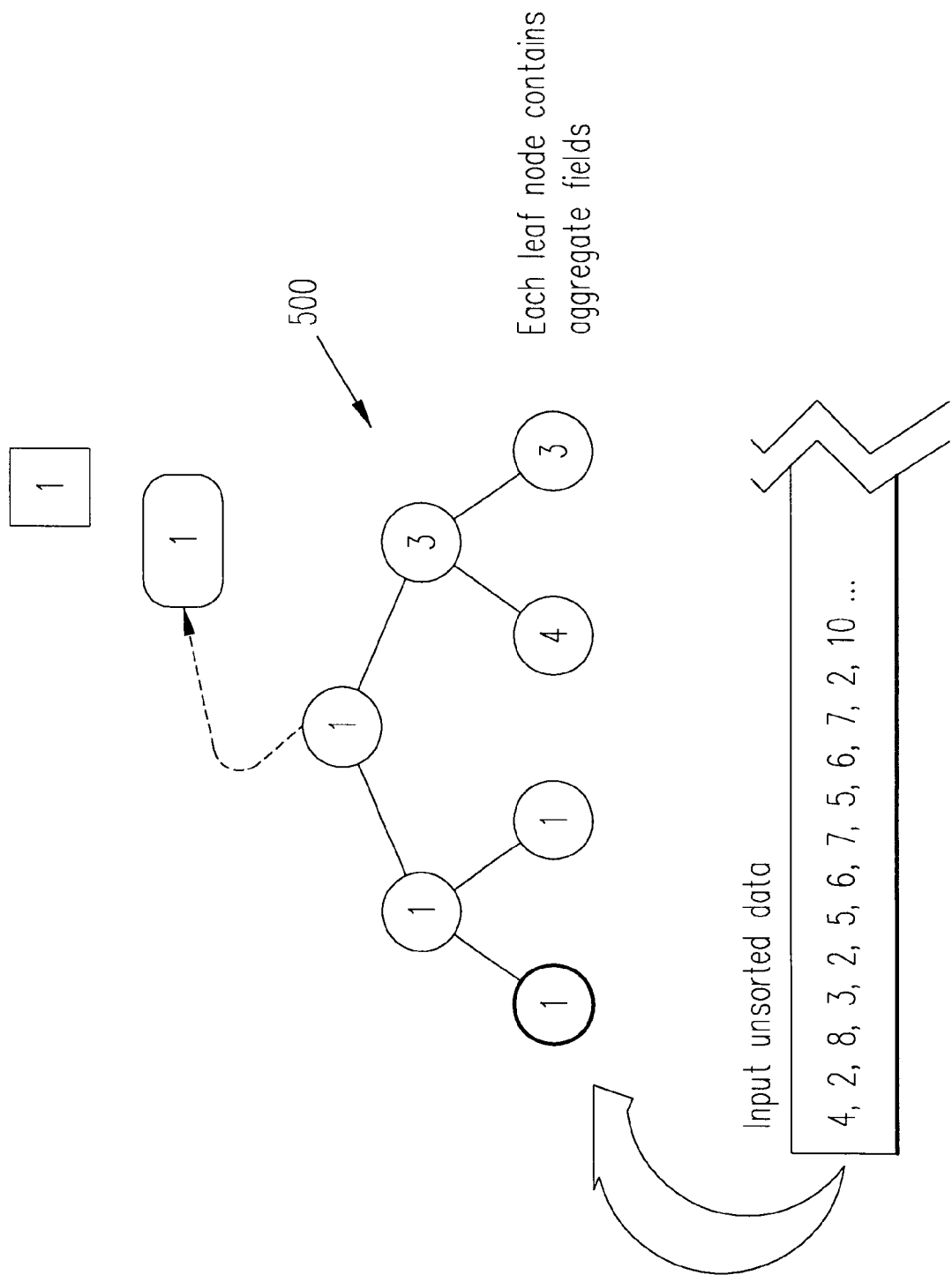
FIG. 5 is a diagram illustrating early aggregation with a tournament tree.

FIG. 5 is a diagram illustrating early aggregation with a tournament tree 500.

Each leaf node of the tournament tree 500 contains aggregate fields. Equal comparison of keys between leaf nodes results in early aggregation of column functions.

Figure 6:
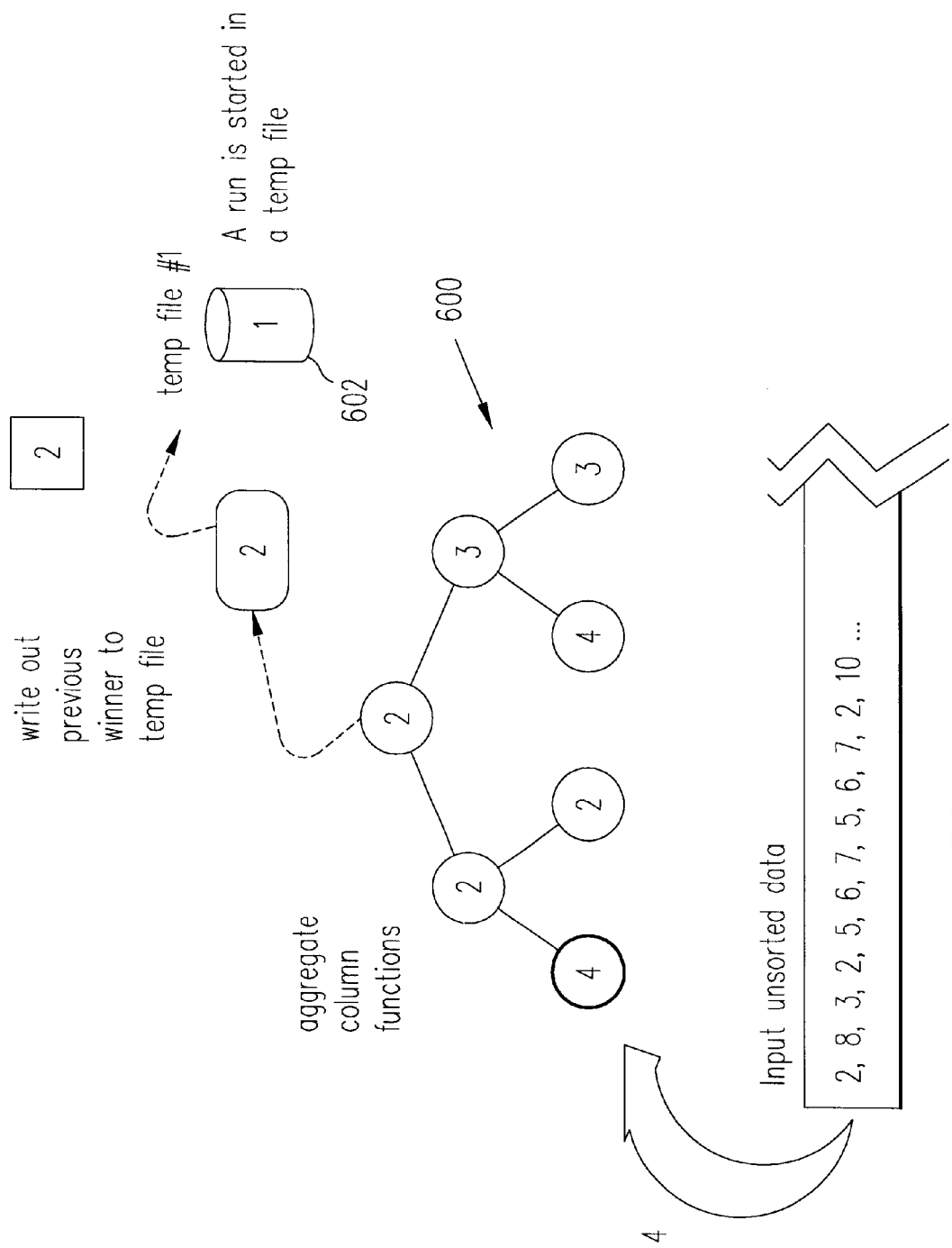
FIG. 6 is a diagram illustrating storage of winners of tournaments in temporary data sets.

FIG. 6 is a diagram illustrating storage of winners of tournaments in temporary data sets. When a new winner is selected from the tournament tree 600, the previous winner is written to a temporary data set 602.

Figure 7:
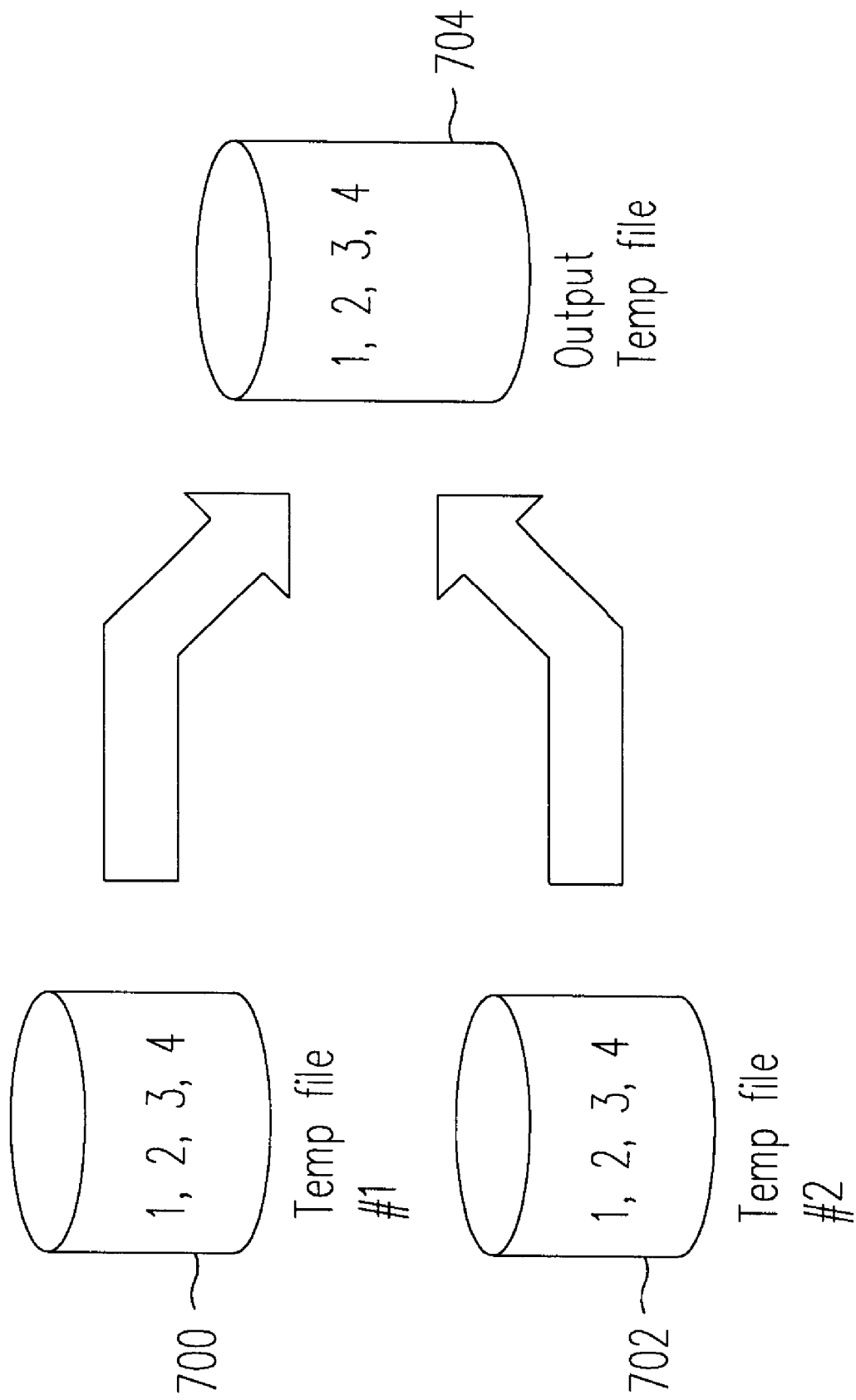
FIG. 7 is a diagram illustrating the merge phase of a tournament tree sort at a high level.
Figure 8:
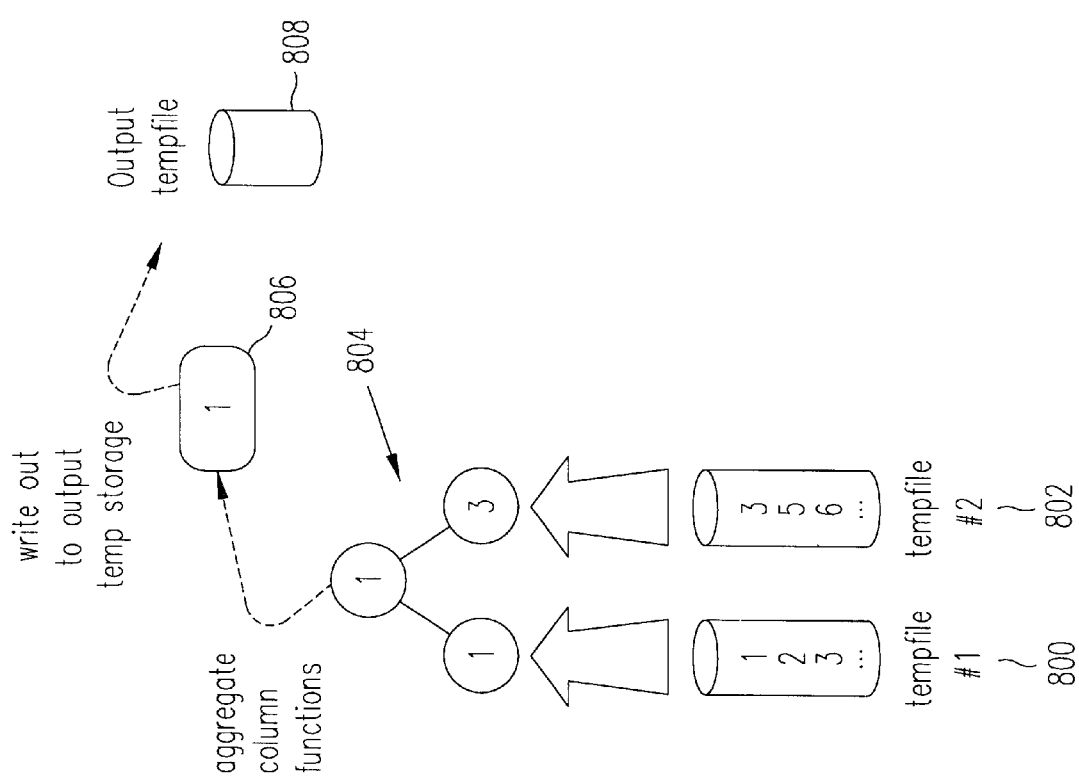
FIG. 8 is a diagram illustrating the merge phase of a tournament tree sort in more detail.

FIGS. 7–8 are diagrams illustrating the merge phase of a tournament tree sort. FIG. 7 is a diagram illustrating the merge phase of a tournament tree sort at a high level. A temporary data set # 1 700 is merged with a temporary data set #2 702, and the results are stored in an output temporary data set 704. Initially, keys from the temporary data sets 700 and 702 are input into a tournament tree. The winner is stored into a temporary data set 704. The winner is replaced with the next key from the input sequence from the temporary data sets 700 and 702 until all of the temporary data sets 700 and 702 are merged.

FIG. 8 is a diagram illustrating the merge phase of a tournament tree sort in more detail. A temporary data set #1 800 and a temporary data set #2 802 are input to a tournament tree 804. Aggregate column functions are performed as the data from the temporary data sets 800 and 802 is processed. The winner 806 of each tournament is stored in an output temporary data set 808.

Figure 9:
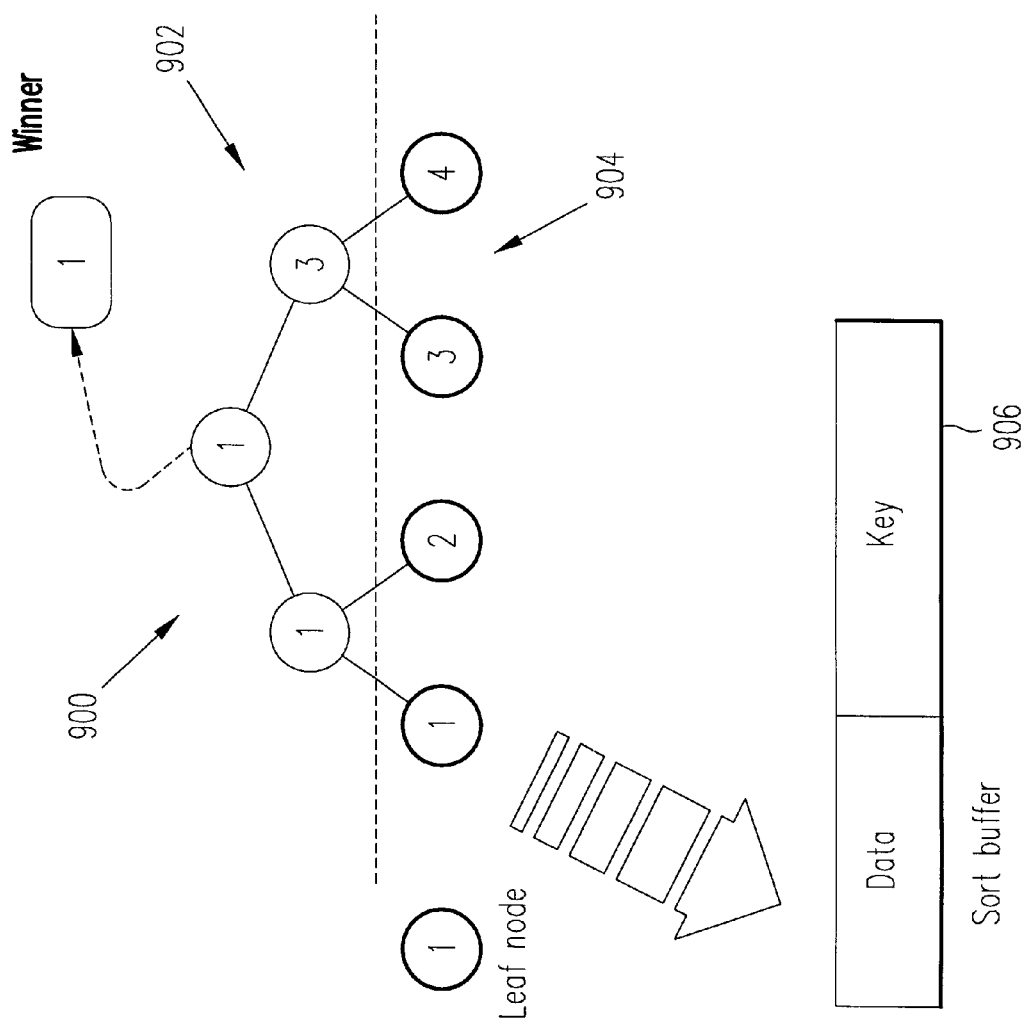
FIG. 9 is a diagram illustrating a groupby sort tree.

FIG. 9 is a diagram illustrating a groupby sort tree 900. The groupby sort tree 900 has internal tree nodes 902, which are pointers to the actual data. Additionally, the groupby sort tree 900 has external tree nodes 904, which are stored in sort buffers 906 in local storage.

Figure 10:
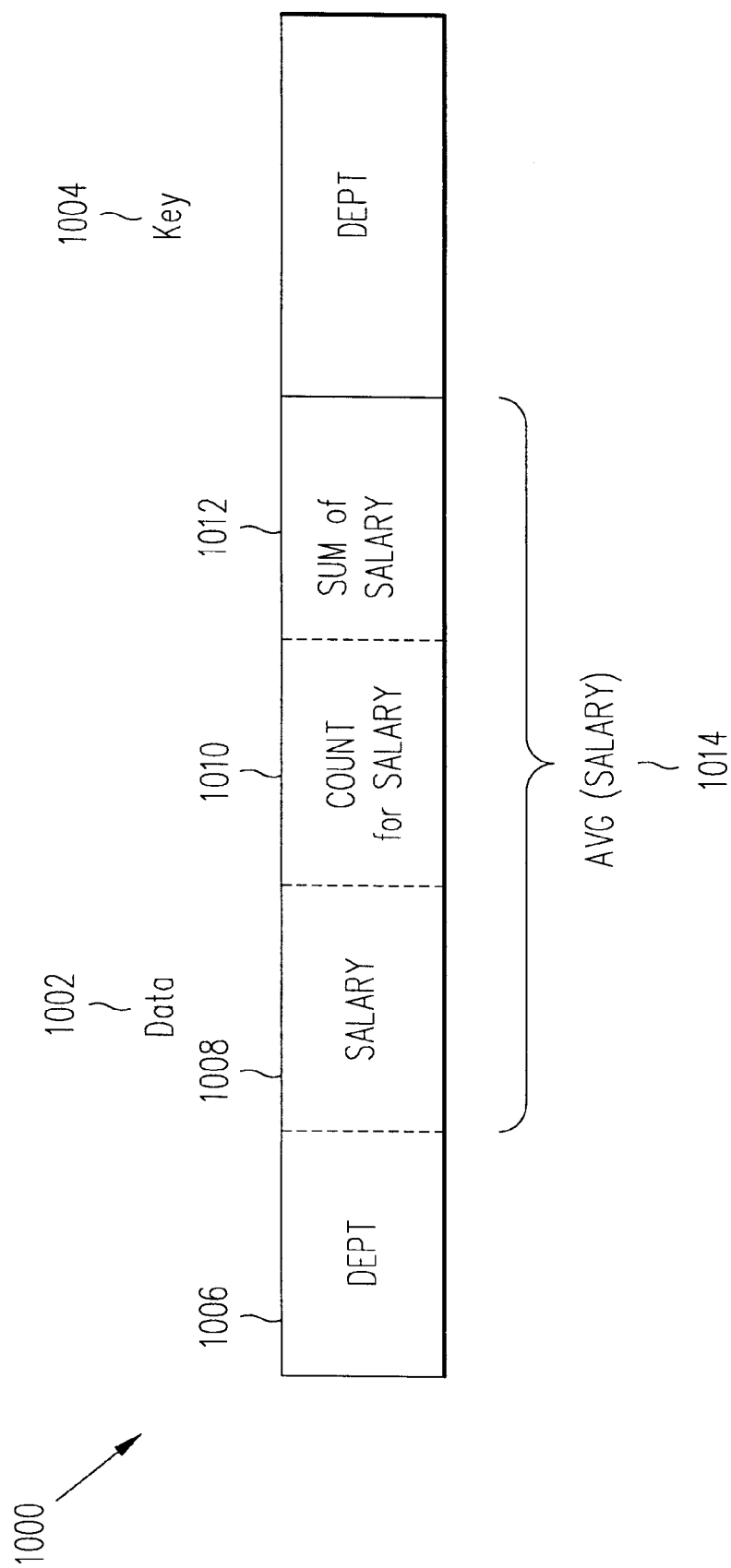
FIG. 10 is a diagram illustrating a groupby sort record.

FIG. 10 is a diagram illustrating a groupby sort record. The groupby sort record 1000 has a data portion 1002 and a key portion 1004. For illustration, the groupby sort record 1000 is for the following groupby statement:

SELECT DEPT, AVG (SALARY) FROM EMP GROUP BY DEPT

The data 1002 for the groupby sort record 1000 contains entries for the dept 1006, salary 1008, count for salary 1010, and sum of salary 1012. The average salary 1014 is computed using the salary 1008, count for salary 1010, and sum of salary 1012 entries.

Conventional System Problems

Figure 11:
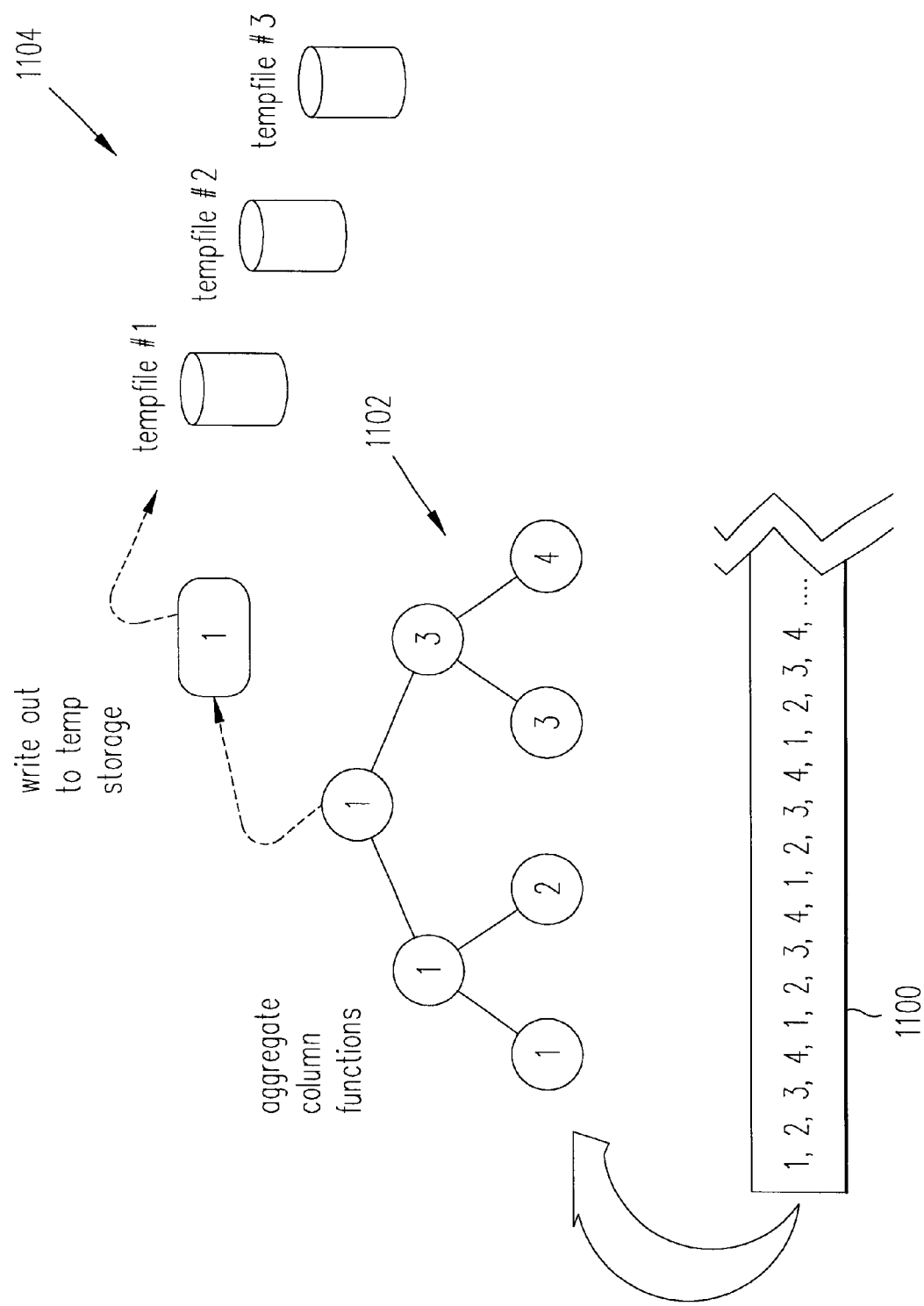
FIG. 11 is a diagram illustrating the need for many temporary data sets in a conventional system.

In a conventional system, use of a tournament tree for a groupby sort for a large amount of data leads to a small number of groups being formed, with each group of sorted data stored in a separate temporary data set. Additionally, many concurrent sorts may lead to use of memory resources. FIG. 11 is a diagram illustrating the need for many temporary data sets in a conventional system. As the input sequence 1100 is input to the tournament tree 1102, winners of tournaments are written to temporary data sets 1104. Each temporary data set contains data that is sorted, because, winners of tournaments are selected as winners based on some order (e.g., the lowest value always wins in a comparison of values), and the winners are entered sequentially into the temporary data set. Whenever a new winner is one whose entry in a temporary data set would cause the temporary data set to be unsorted, a new temporary data set is started. For example, if a temporary data set contains keys (1, 2, 3), and then a new winner is key (1), then adding key (1) sequentially after keys (1, 2, 3) would cause the sorted data to be unsorted. Therefore, the new winner is placed in a new temporary data set. Thus, there could be many temporary data sets created during the sort process.

Figure 12A:
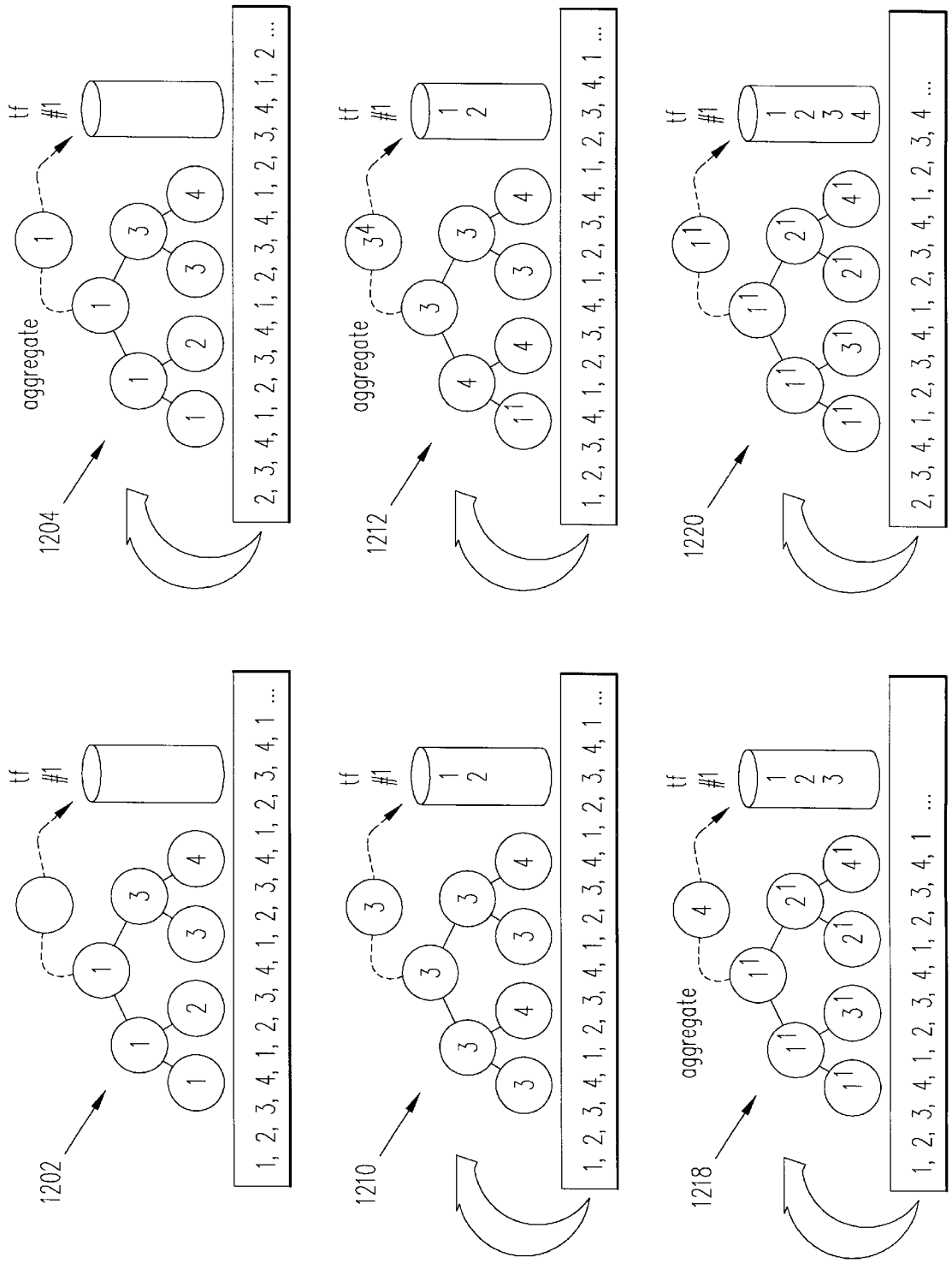
FIG. 12 is a diagram illustrating an example tournament tree sort.

FIG. 12 is a diagram illustrating an example tournament tree sort. In tournament tree 1202, keys are input into the tournament tree 1202 from the input sequence. In tournament tree 1204, a winner is found to be key (1). In tournament tree 1206, the previous winner key (1) is replaced in its leaf node with a new key from the input sequence, which in this case is key (2). Then, key (2) becomes a new winner, and the previous winner key (1) is written to a first temporary data set. In tournament tree 1208, key (2) is again a winner, and any aggregate functions that need to be performed are performed. In tournament tree 1210, a new winner is key (3), and so key (2) is written to the first temporary data set. In tournament tree 1212, key (3) is again the winner and is aggregated. Additionally, the winner key (3) is replaced by new input from the input sequence, which in this case is a key (1). The new input is entered into a leaf node of the tree as key ($1^1$), with the superscript "1" indicating that a key (1) has already been seen earlier in the input sequence. In tournament tree 1214, key (4) is the winner, and key (3) is written to the first temporary data set. In tournament tree 1216, key (4) is again the winner and is aggregated. In tournament tree 1218, key (4) is again the winner and is aggregated. In tournament tree 1220, key (1) is the winner, and key (4) is written to the first temporary data set. In tournament tree 1222, key ($2^1$) is the winner, with key ($1^1$) being the previous winner. Since key (1) was already seen earlier in the input sequence, and because the first temporary data set is ordered sequentially, adding key (1) again to the temporary data set after key (4) would lead to the first temporary data set being unsorted. Therefore, the new key (1) is added to a second temporary data set.

Figure 13:
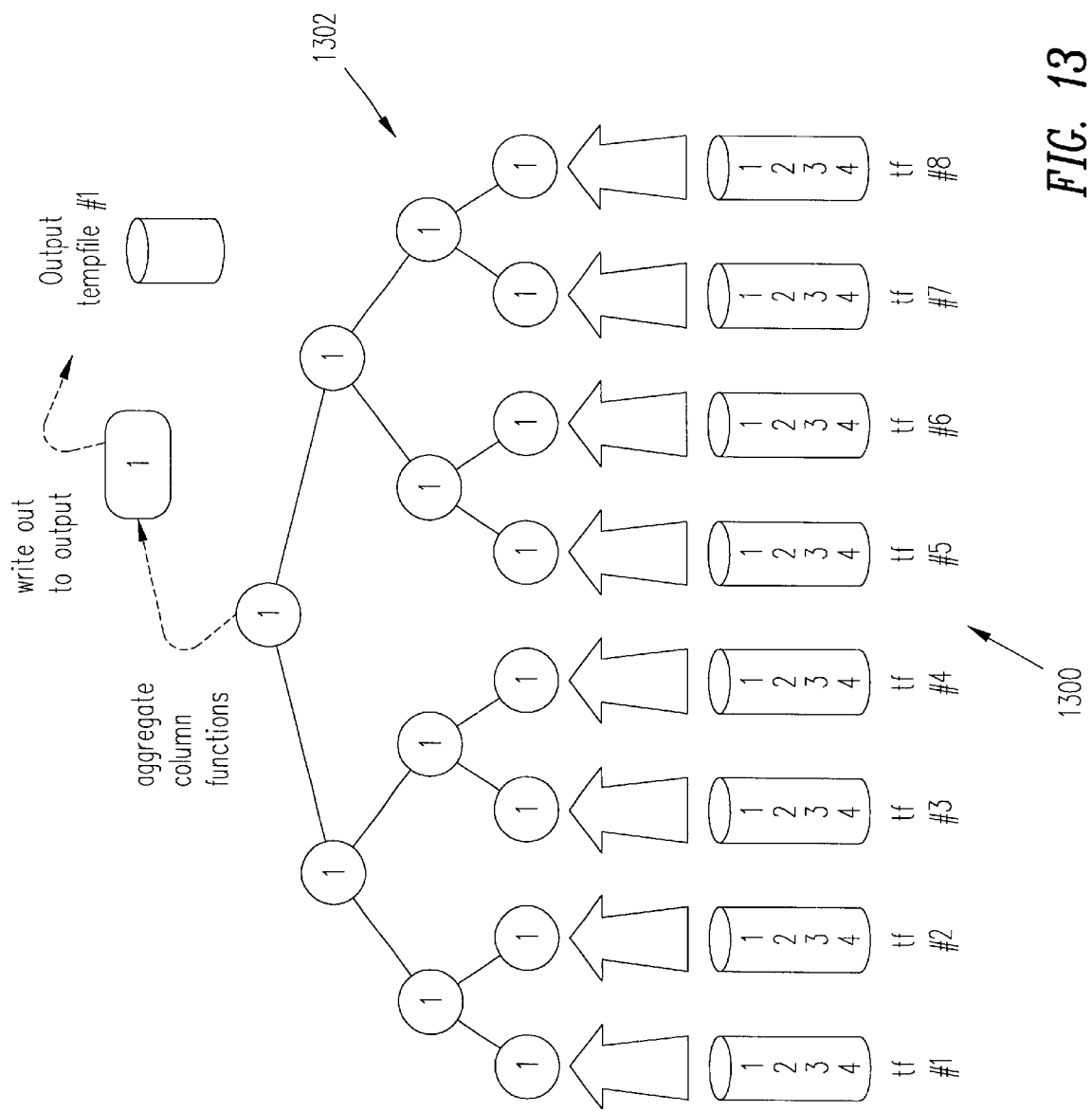
FIG. 13 is a diagram illustrating some symptoms of the problems of conventional systems.

FIG. 13 is a diagram illustrating some symptoms of the problems of conventional systems. For example, during the input phase, there could be a large number of temporary data sets 1300 that are sparsely populated. Additionally, during the input phase, a conventional system will use the largest sort tournament tree 1302 that is allowed based on the available memory. During the merge phase, the merge could take multiple merge passes due to resource constraints. Moreover, a conventional system cannot run multiple streams because of resource starvation.

Overview of Solution

Figure 14:
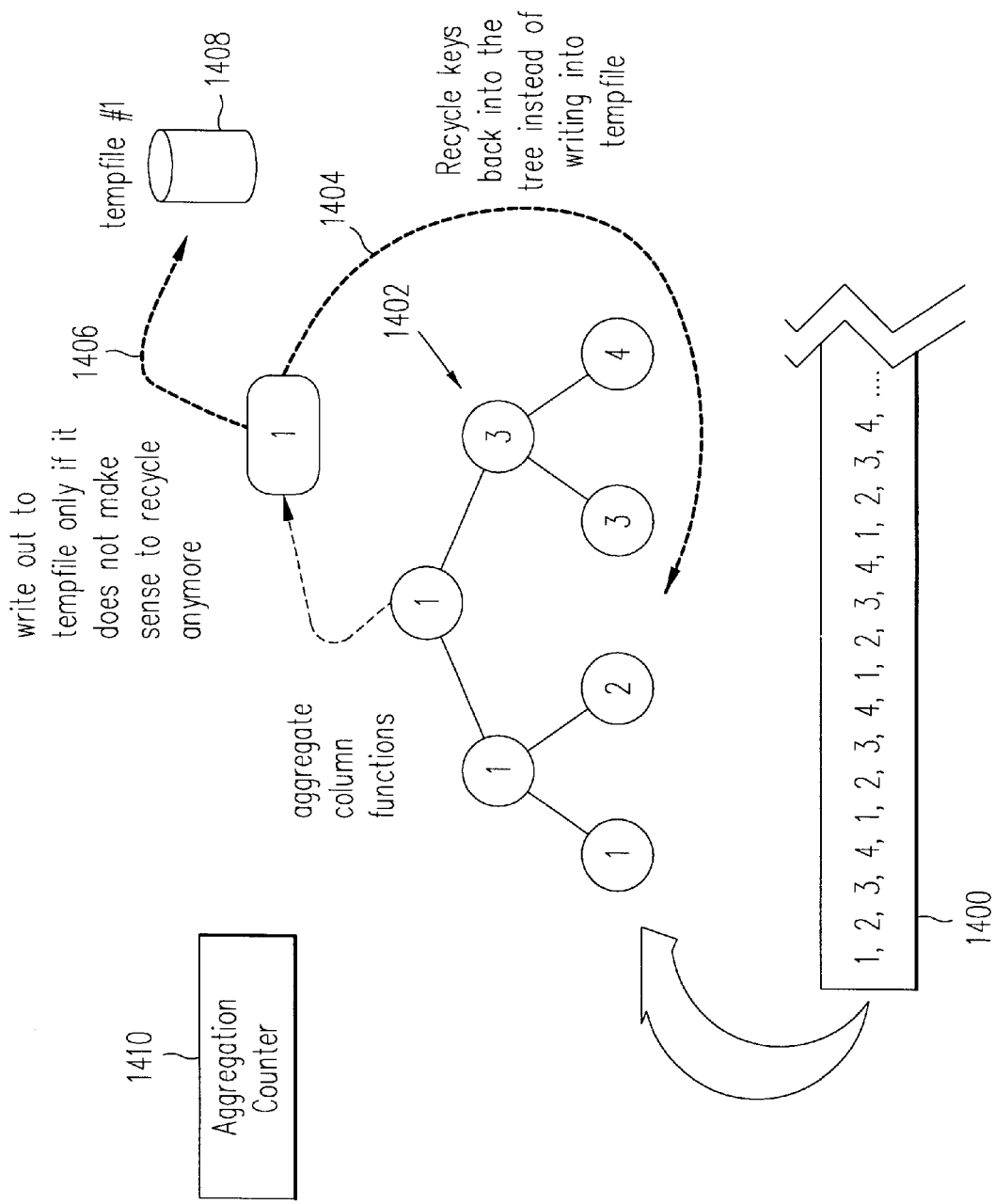
FIG. 14 is a diagram illustrating an overview of the groupby aggregation system.

FIG. 14 is a diagram illustrating an overview of the groupby aggregation system 124. An input sequence 1400 is input to a tournament tree 1402, with the input being screened into a finite number of buckets. The screening results in a significant reduction of the tournament tree size, which requires less memory. When the number of groups of input data is small, this results in significant performance enhancement. The screening is stopped if it is no longer effective. That is, if the number of buckets is high, but no aggregation is taking place, then the bucket sort ceases and key recycling takes over.

For key recycling, keys are recycled 1404 back into the tree instead of being written into temporary data sets 1408. Recycling could result in a significant reduction of the number of temporary data sets generated, which again saves memory. Also, recycling reduces the number of merge passes by reducing the number of temporary data sets. However, keys are written to the temporary data set 1408 when it does not make sense to recycle the key. Because of recycling, the temporary data sets will tend to contain more records. Additionally, column functions are aggregated, and an aggregation counter 1410 maintains the aggregate values.

Winner Aggregation

It has been suggested in the literature that aggregation should be pushed into the sort component of a RDBMS. That is, aggregation should be performed within a sort that uses a tournament tree. One technique is to compare consecutive winners of tournaments, and if they are identical, to accumulate sums and counts (i.e., the aggregation operations) for these two consecutive winners. The technique proceeds recursively, with the key of the aggregate being the key against which the next winner is compared. A group break is detected when a non-matching key emerges as the new winner, and a new group begins, with the initialization of a new accumulator, and count variables. One issue with this approach is that several runs of different groups could be formed, even if the number of groups is less than the number of nodes in the tournament tree.

FIG. 15 is a diagram illustrating an example of winner aggregation, with grouping over the following input sequence of keys: 1, 2, 1, 3, 3, 3, 1, . . . .

The tournament tree 1500, consisting of four leaf nodes in this example, is populated with input from the above sequence of keys being input to the leaf nodes. Then, parent nodes are labeled with the winning key based on a comparison of the keys of the children. If two keys in a comparison are equal, the tie is broken by declaring the key from the left subtree as the winner.

In the tournament tree 1502, the winning key (1) from tournament tree 1500 is replaced by the next key in the sequence to be sorted, which in this case is key (3). The tournament along the path from the location of replacement to the root is redone, resulting in the new state of the tournament tree. Since the previous winner key (1) and current winner key (1) are identical, aggregation between the two keys is performed. The winning key (1) is replaced by the next key (3) in the sequence, the appropriate keys are compared again, and the new state of the tournament tree is tournament tree 1504. In tournament tree 1504, the new winner is key (2).

This state of the tournament tree 1504 illustrates a problem. Key (2) is the winner and replaces key (1) as the previous winner. Key (1) and any associated aggregate fields are written to a temporary data set. Notice, the key with value key (1) does not appear anywhere in the tournament tree 1504. Key (3) appears multiple times, occupying as many nodes in the tree as the number of times it occurs. Key (1) appears next in the input sequence. Key (1) can not be part of the current sort run, even if there are only three distinct keys in the sequence (i.e., less than the number of nodes in the tournament tree). Therefore, key (1), along with a tag indicating it cannot participate in the current run, replaces the winner key (2). The tag is placed for any new key that is smaller than the previous winner of the tree. The case when the new key is the same as the previous winner is treated by aggregating the new key into the aggregate fields of the previous winner. The resulting state of the tournament tree is shown in tournament tree 1506.

For a tournament tree with a large number of nodes, if a string of keys with value key (3) were to occupy all the nodes of the tournament tree, then, again, key (1) would be lost from the tournament tree. This is mentioned to illustrate the point that such occurrence is not related to the number of distinct values of keys being less than the number of nodes in the tree by key (1), as was the case in the example shown in FIG. 15.

Early Aggregation

An extension of the winner aggregation technique is early aggregation. In terms of extra storage, winner aggregation requires that aggregate fields be kept for only one key, the winning key. In early aggregation, aggregate fields are maintained for every leaf node in the tournament tree. That is, it is possible to perform partial aggregation, even before two equal keys emerge as winners. Early aggregation is possible as early as the first instance of equal comparison between two keys. However, it is still possible, even when the number of distinct keys is smaller than the number of nodes in the tournament tree, aggregation will not be complete within the tree. Records for keys that emerge from the tree, along with their associated aggregate fields, are written into temporary data sets.

Figure 16A:
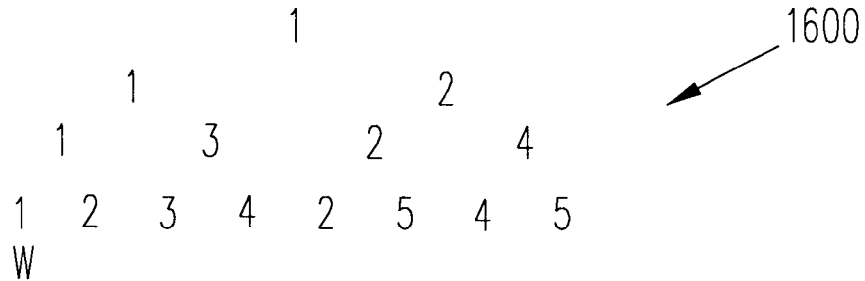
Figure 16A:
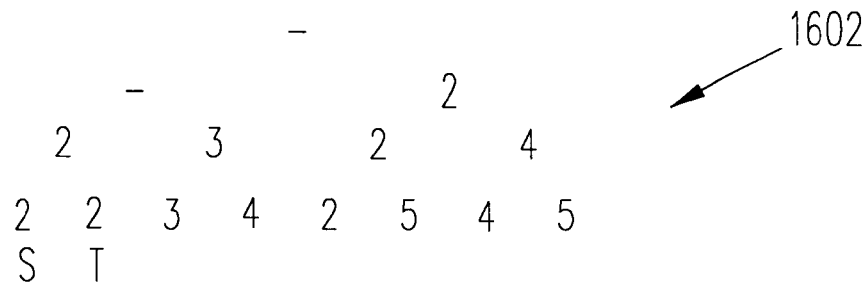
Figure 16A:
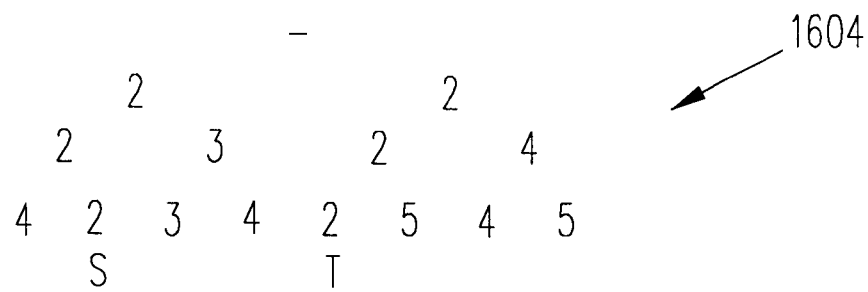

FIGS. 16A–16B are diagrams illustrating an example of early aggregation, computing aggregates, via sorting, on the following sequence of keys: 1, 2, 3, 4, 2, 5, 4, 5, 2, 4, 5, 0. In the example of FIGS. 16A–16B, the tournament tree has eight leaf nodes. If any two keys compare equal at any level of the tournament tree, the keys are immediately aggregated. A protocol is provided to determine which key will be aggregated into which. For the example, the two keys are distinguished by noting that one key is the previous key at that level, and the other is the new key. Without any loss of generality, the new key is aggregated into the previous key. The entry occupied by the new contestant becomes available for use by the next key in the sequence.

The tournament tree 1600 is initialized by inputting keys from the input sequence into the leaf nodes. Key (1) is the winner and is replaced by the next key in the input sequence, key (2), as illustrated in tournament tree 1602. The new key (2) compares equal with another key (2) during its first comparison. The new key (2) is aggregated into the previous key (2). New key (2) is marked S, because it is the source of the aggregation. The previous key (2) is the target into which the aggregation takes place, and is marked with a T. The location marked S is freed up after the aggregation.

The next key in the input sequence is key (4), which replaces the leaf node freed up by the source key (2), as illustrated in tournament tree 1604. Key (4) causes key (2), the target of the previous aggregation, to win the first comparison. However, at the final comparison, key (2) finds a match with another key (2), and aggregates into it.

The state of the tournament tree is illustrated in tournament tree 1606. The next key in the input sequence is key (5), which replaces the source key (2), causing the remaining key (2) to be declared winner. The next key in the input sequence is key (0). Since key (0) is smaller than the previous winner key (2), key (0) cannot participate in the current run of the tournament. Therefore, key (0) is inserted with a flag (n), that causes key (0) to be part of the next run.

The example illustrates the important point that, although the keys are being aggregated when they are first found to compare equal to another key in the tree, it is still possible to spill over to temporary data sets, even when the number of distinct keys is smaller than the number of leaf nodes in the tree. In the example of FIGS. 16A–16B, there were eight leaf nodes, six distinct keys, and at least two runs, with the first run spilling to a temporary data set. When compared with just winner aggregation, early aggregation causes fewer runs to be written out, mitigating the problem of CPU and I/O overheads.

Key Recycling

Figure 17:
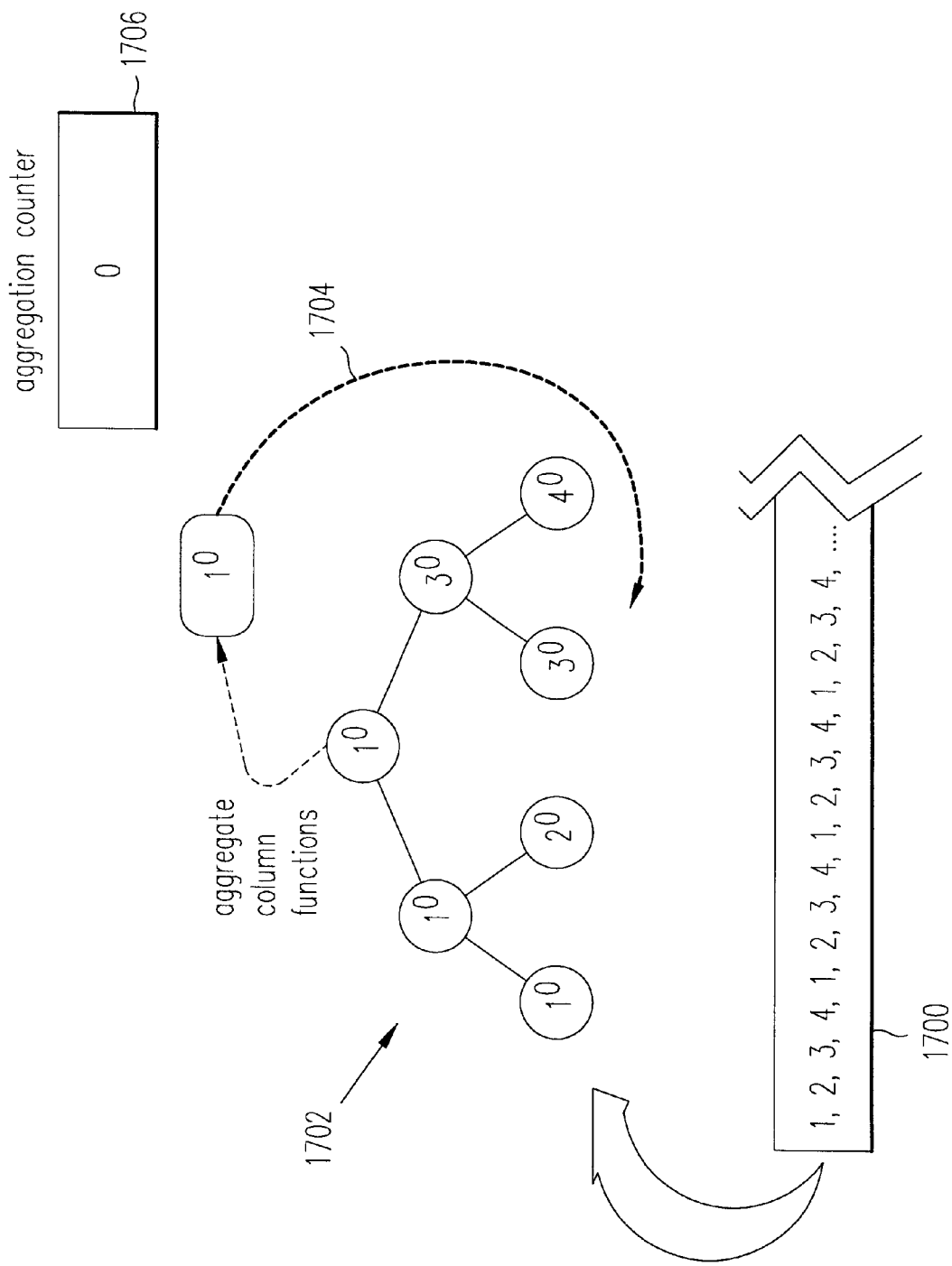
FIG. 17 is a diagram illustrating key recycling.

The groupby aggregation system 124 performs key recycling to significantly reduce CPU and I/O overheads. Winner aggregation is a pre-requisite for key recycling. The central idea is that a key that has emerged from the tournament tree must not be lost from the tournament tree. The key is reinserted into the tournament tree, with a marker indicating the key must remain in the tournament tree until the next sequence starts. When the key is re-inserted, the key brings along with it, any aggregate fields that hold partial aggregation results for this key. FIG. 17 is a diagram illustrating key recycling. Keys from an input sequence 1700 are input to a tournament tree 1702. Instead of storing keys into temporary data sets, the keys are recycled 1704. Aggregation is maintained with an aggregation counter 1706.

The groupby aggregation system 124 can detect conditions for key recycling termination based on two techniques. In one technique, distinct key values are counted. Key recycling is terminated when the number of distinct keys is greater than the number of leaf nodes in the tournament tree. Unique groups are counted as the winners emerge from the tree. If the number of unique groups becomes greater than half the number of nodes in the tree, then key recycling is turned off, and winning keys are inserted into the temporary data set, instead of being recycled back into the tournament tree. In another technique, the number of aggregations between successive rounds of recycling are counted. If the count of the number of aggregations falls below a certain threshold, then the key recycling is terminated.

FIGS. 18A–18B are diagrams illustrating the key recycling technique for the same input sequence as was used in the example for winner aggregation, which was illustrated with reference to FIG. 15. The input sequence of keys given is: 1, 2, 1, 3, 3, 1, 2 . . . .

The first four keys are inserted into the tournament tree 1800 with four leaf nodes. The initial state of the tournament tree is no different from the earlier example of winner aggregation. Similarly, the second step is identical, as well and is illustrated in tournament tree 1802. Initially, key (1) is the winner of tournament tree 1800. When the winning key (1) is replaced by the next key (3) in the input sequence, key (1) again becomes the next winner in tournament tree 1802.

In winner aggregation above, two consecutive wins by key (1) would cause winner aggregation, and the data associated with key (1) would be inserted into a temporary data set. In the place of winning key (1), a key (3) is inserted from the input sequence into tournament tree 1804. At this point, key (2) is the winner. The groupby aggregation system 124 differs exactly here. Instead of writing key (1) and its associated aggregate fields to the temporary data set, the groupby aggregation system 124 re-inserts key (1) into the tree, at the place of key (2), the current winner, with a flag indicating that key (1) should not participate in the current run. One technique for generating this flag is to pad each key with a run number before a high order byte. Then, the expanded key is treated as the entire key for comparison. Initially, the groupby aggregation system 124 starts with the run number being assigned a value of zero. When a key is inserted that does not participate in the current run, the key is padded with a run number one higher than that of the run being produced. This technique is already in use for many implementations of tournament tree based sort for handling new keys in the sequence that may be smaller than the current winner of the tournament tree, at the time the new key is introduced into the tournament tree.

In tournament tree 1806, the previous winning key (2) is replaced with key (n1). As the example illustrates, instead of bringing the next key in the sequence into the tree, the groupby aggregation system 124 recycled the previous winner into the tree, thus, delaying the consideration of the next key of the input sequence. The groupby aggregation system 124 prefixes the recycled key (1) with the symbol (n). Any key with a prefix of (n) will lose to any existing key in the tree without a prefix (n).

In tournament tree 1806, key (3) is the winner. The next key to be inserted will be the recycled key (2), rather than the new key (1) of the input sequence. That is, key (n2) is recycled into the tournament tree 1808. Again, if key (2) had been written into the temporary data set, then key (2) would have been lost from the tournament tree.

Since the previous and current winners are the same (i.e., key (3)), and winner aggregation is in effect, the aggregates needed for key (3) are accumulated from the data associated with each of these two winner keys.

The next new key in the sequence, 1, is inserted in place of the winner key (3). However, the new key (1) comes with the marker that it cannot participate in the current sequence of winners emerging from the tree, since it is smaller than the most recent winner, key (3). Therefore, key (n1) is inserted in place of key (3) in tournament tree 1810. Again, since the previous and current winners are the same (i.e., key (3)), the aggregates are accumulated.

If the input file is exhausted before all of the keys are recycled, then the groupby aggregation system 124 is in the middle of a recycling run. The recycled keys, which are smaller in value, are in run number (n+1). The larger keys, that have not been recycled are in run number (n).

In order to flush the smaller valued keys out of the tree, phantom keys are introduced into the tree when an end of input is detected. These keys are introduced as belonging to run number (n+2) so that they will flush out keys of both run number (n+1) and (n).

The tournament sort continues with key recycling until the keys in run number (n+1) start emerging from the tree. When this happens, they will be written to the temporary data set. Writing to the temporary data set ceases when the phantom key with run number (n+2) emerges.

Aggregation within a Tournament Tree

Aggregation can be done within the tournament tree. In the sequence to be sorted in the following example, there are more distinct keys than nodes in the tournament tree.

FIGS. 19A–19C are diagrams illustrating aggregation within a tournament tree with the following input sequence of keys: 1, 2, 3, 4, 5, 6 . . . , and a four leaf node tournament tree.

Initially, the first four keys from the input sequence are input to tournament tree 1900. In tournament tree 1900, key (1) is the winner, and the winning key is replaced by key (5) of the input sequence in tournament tree 1902. In tournament tree 1902, key (2) is the winner, and so key (1) is recycled into tournament tree 1904.

Then, key (2) is recycled into tournament tree 1906. Continuing with the processing, key (3) is recycled into the tournament tree 1908. In tournament tree 1910, key (4) is recycled.

Notice, that if key (5) is recycled and processing continues in this manner, the result is an infinite loop, with keys being recycled forever. This situation arises because there are more distinct keys than there are leaf nodes.

One technique for avoiding this situation is to have a means to detect that the number of distinct keys is greater than the number of nodes in the tree. Another technique is to count the number of aggregations. In either case, the keys spill over to a temporary data set.

Under the distinct key technique, the condition is detected by counting the number of distinct keys produced as winners of the tournament tree, as long as the winning keys are increasing in value. The count is reset when a smaller key emerges subsequent to a larger key. It is not sufficient to count only the first ascending input sequence of keys because the number of distinct keys appearing in an input sequence is monotonically non-decreasing in the length of the input sequence. In other words, more and more new keys can occur as the input sequence is sorted.

Additionally, under the counting aggregations technique, the number of aggregations is counted. If the aggregations between successive recycling runs (i.e., between the run number (i) and run number (i+1)) falls below a certain threshold, then recycling is terminated, and the tournament tree output is written out to a temporary data set. After writing out all of the records for run number (i+1), recycling resumes.

Continuing with the example of FIGS. 19A–19C, when key (4) is the winner, the groupby aggregation system 124 recognizes that there are at least as many distinct keys as there are nodes in the tree. When key (5) is the next winner in tournament tree 1910, the groupby aggregation system 124 recognizes there are more distinct keys than nodes in the tree and spills over to the temporary data set for this aggregation.

Key (5) is recycled into tournament tree 1912, causing key (1) to re-emerge as winner. This time, key (1) is no longer a candidate for recycling and is written to the temporary data set.

Of course, the cost of not spilling over to the temporary data set from the beginning, in this example, is that five keys were inserted twice into the tournament tree, rather than once. This also happens to be the worst case scenario, in which the number of extra inserts into the tournament tree is exactly equal to the number of leaf nodes in the tournament tree. In practice, this loss is likely to be partially, fully or more than offset by the gain in the aggregation of identical keys detected by comparing two successive winners.

Combining Early Aggregation and Key Recycling

If a key has associated aggregate fields, then it becomes possible to compute partial aggregates for the key when two keys are found equal during comparisons in the tournament tree. That is, early aggregation can be combined with key recycling. The following example will illustrate this combination and show that the benefits are cumulative.

Figure 20:
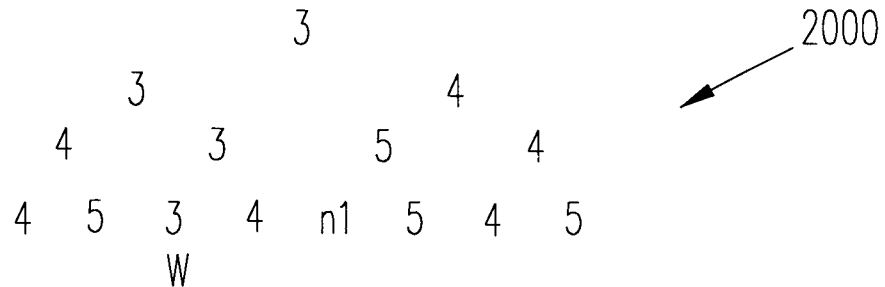
FIG. 20 is a diagram illustrating an example in which early aggregation is combined with key recycling.
Figure 20:
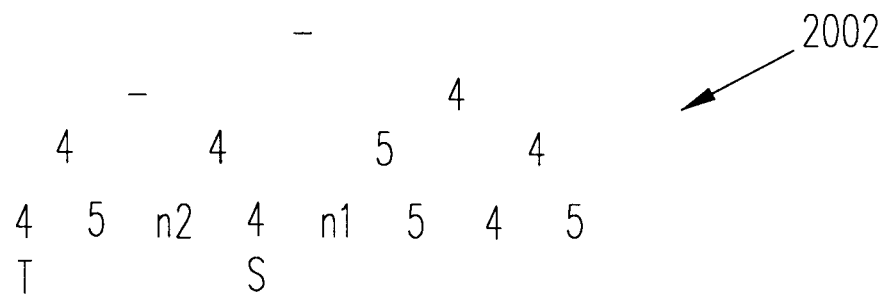
Figure 20:
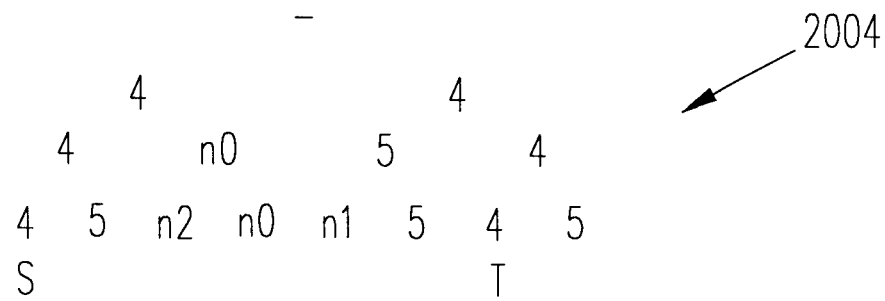
Figure 21A:
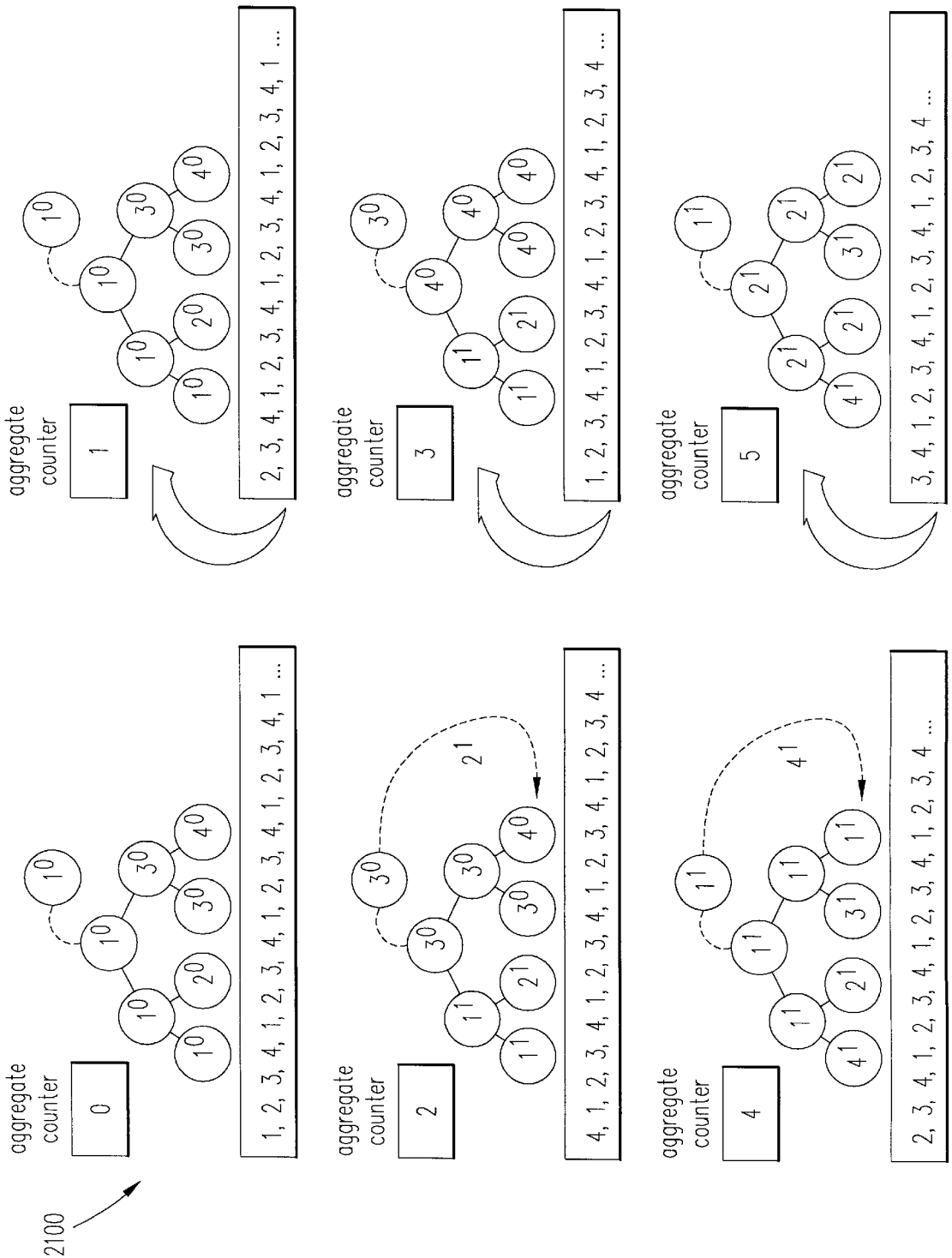
FIG. 21 is a diagram illustrating another example of key recycling.
Figure 21B:
Figure 21B:
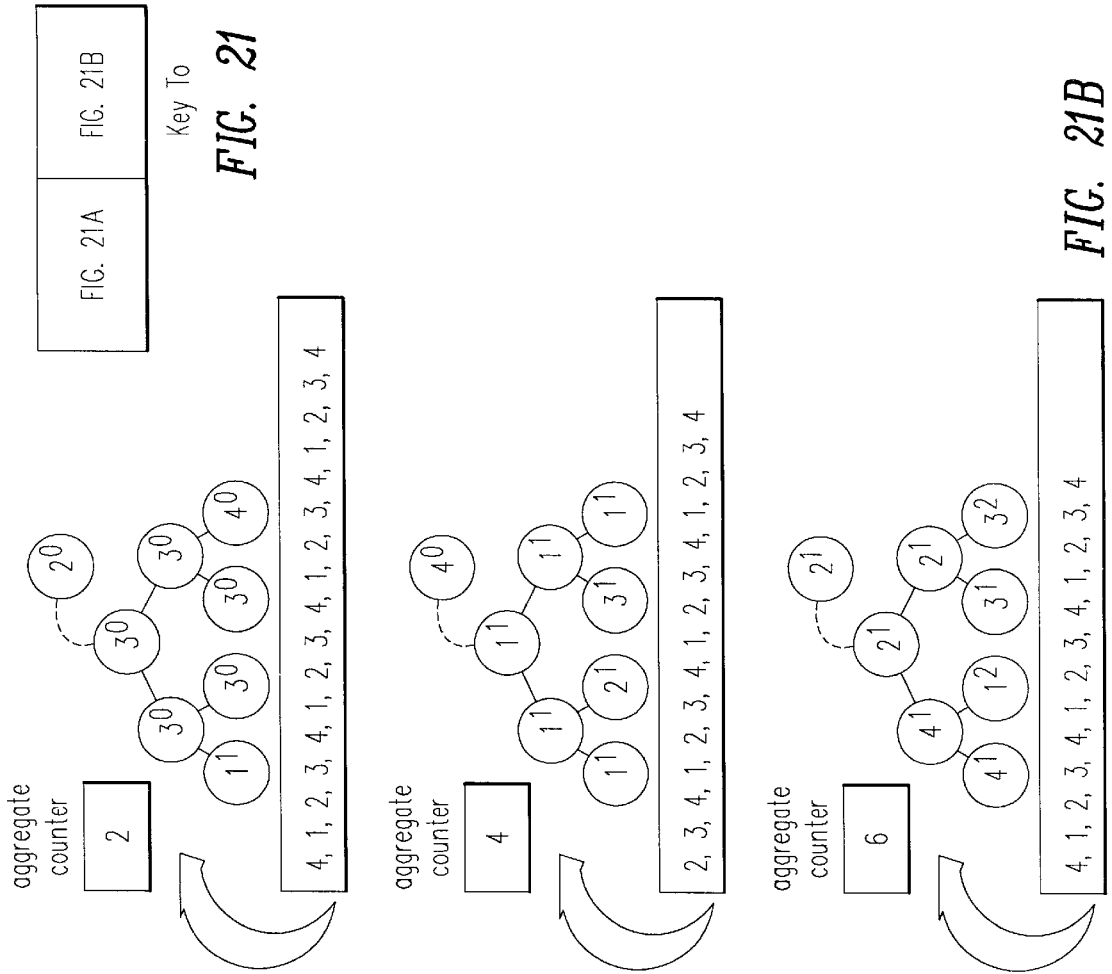
Figure 21B:
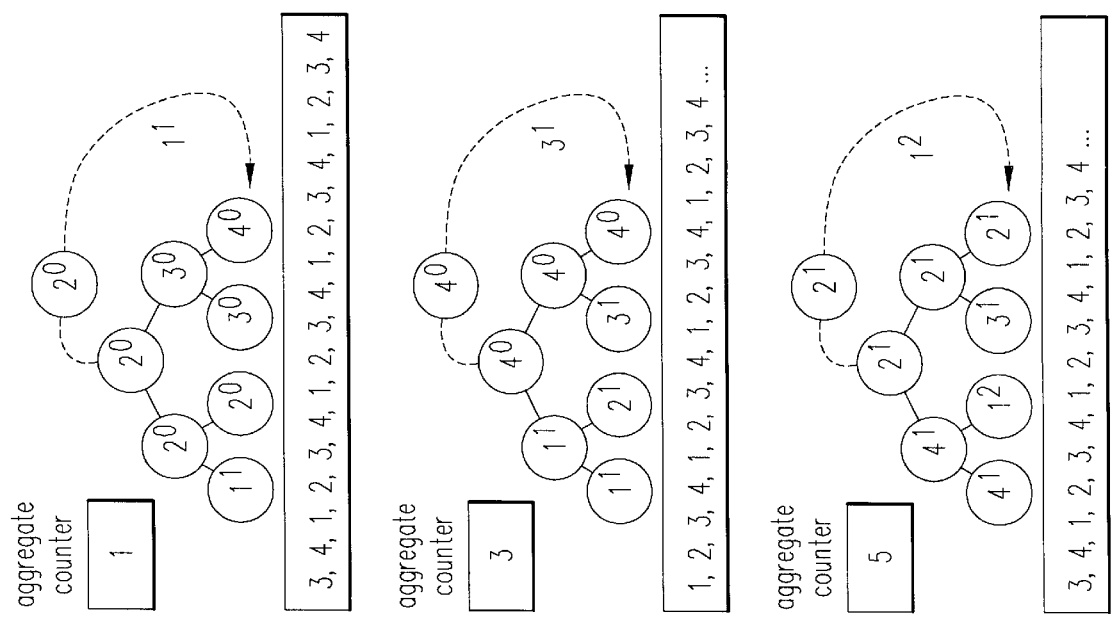

Combining early aggregation with key recycling reduces the number of times a key has to be recycled. FIG. 20 is a diagram illustrating an example in which early aggregation is combined with key recycling. In the last tournament tree 1608 depicted in the example for early aggregation referenced in FIGS. 16A–16B, key (0) was inserted into the tournament tree. On the other hand, in FIG. 20, the groupby aggregation system 124 recycles key (1), instead of writing key (1) into a temporary data set. Therefore, instead of inserting key (0) into the tournament tree as was done in FIGS. 16A–16B, in FIG. 20, key (1) is re-inserted into tournament tree 2000.

Then, key (2) is recycled into tournament tree 2002, causing key (4) to be aggregated within the tournament tree 2002. In place of key (4), the new key (0) is inserted into tournament tree 2004, causing another aggregation of key (4) in the tournament tree 2004.

FIG. 21 is a diagram illustrating another example of key recycling. In the example, an aggregate counter 2100 is used to maintain aggregates.

The extra storage cost for employing key recycling is the same as that for early aggregation. The groupby aggregation system 124 carries accumulators for aggregation for all keys in the leaf nodes of the tournament tree. This implies a larger space demand on main memory compared with winner aggregation only. In situations of constrained main memory, this may lead to a use of fewer leaf nodes in the tournament tree, compared to the case in which only winner aggregation is deployed.

In practice, the number of groups is less than a few thousand. Thus, the groupby aggregation system 124 has practically eliminated the CPU and I/O cost associated with rows written to temporary data sets and with merging. This is obtained at the cost of extra tournament tree insertions of recycled keys.

Bucket Sort

Figure 22:
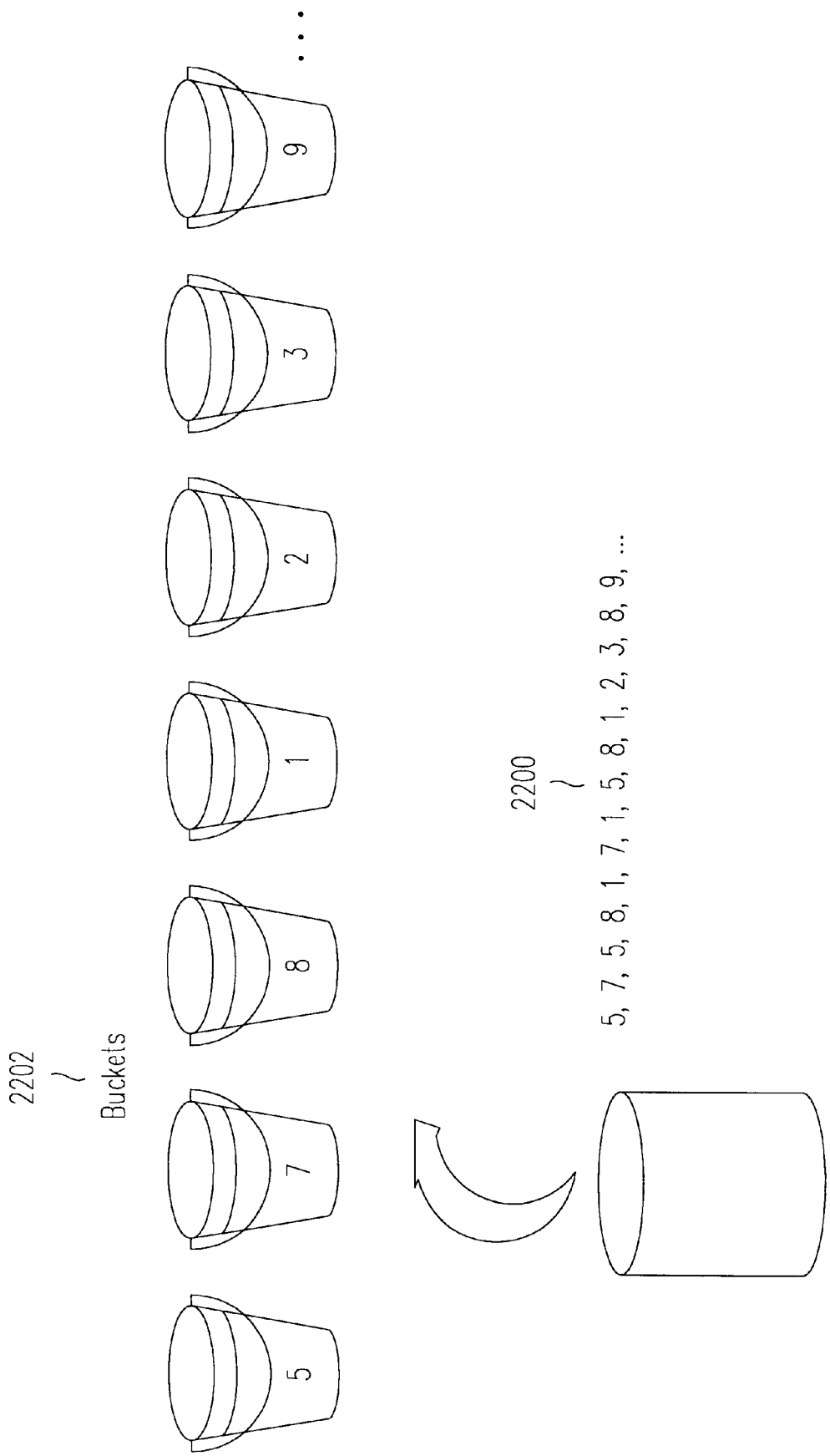
FIG. 22 is a diagram illustrating an example of bucket sort.

For grouping records using column function processing, if the cardinality of groups is very low, then incore storage can be used as "buckets" to hold the aggregation of the column functions as the group by processing takes place. The bucket sort technique is used as input records are read into the sort. As keys are read in, they are compared with existing keys already in the buckets. If there is a duplicate, then the key is aggregated with the key in the bucket. The resulting key, along with any accumulators and count fields that hold partial aggregation results for this key are now contained in the bucket. These fields are referred to as aggregate fields. When all keys are read into the buckets, they are sorted and output. FIG. 22 is a diagram illustrating an example of bucket sort in which keys from an input sequence 2200 are sorted using buckets 2202.

Implementation of bucket sort and key recycling in DB2 Sort involves modifying the input phase. The bucket sort is implemented using the existing sort read node array, in which input data records are first put into the sort tournament tree. Upon entry of the record into the read node array, the key is compared with the previous keys in the previous "buckets" to see if the key can be aggregated. If the key can be aggregated, then the aggregation occurs and the next key is examined. If the key cannot be aggregated, then the key becomes the next bucket, and the next key is read in. This continues until the groupby aggregation system hits a threshold for the optimal number of buckets for the sort or until all of the records are read into the buckets. If the number of buckets is high, but no aggregation is taking place, then the bucket sort ceases and key recycling takes over.

Aggressive Merging and Early Merging

Other techniques, referred to as aggressive merging and early merging, are used to improve group by aggregation. These techniques to improve groupby aggregation have the same storage cost as winner aggregation, as it pertains to the tournament tree. These techniques rely on the usually available shared database buffer pool for storing the accumulators.

Figure 23A:
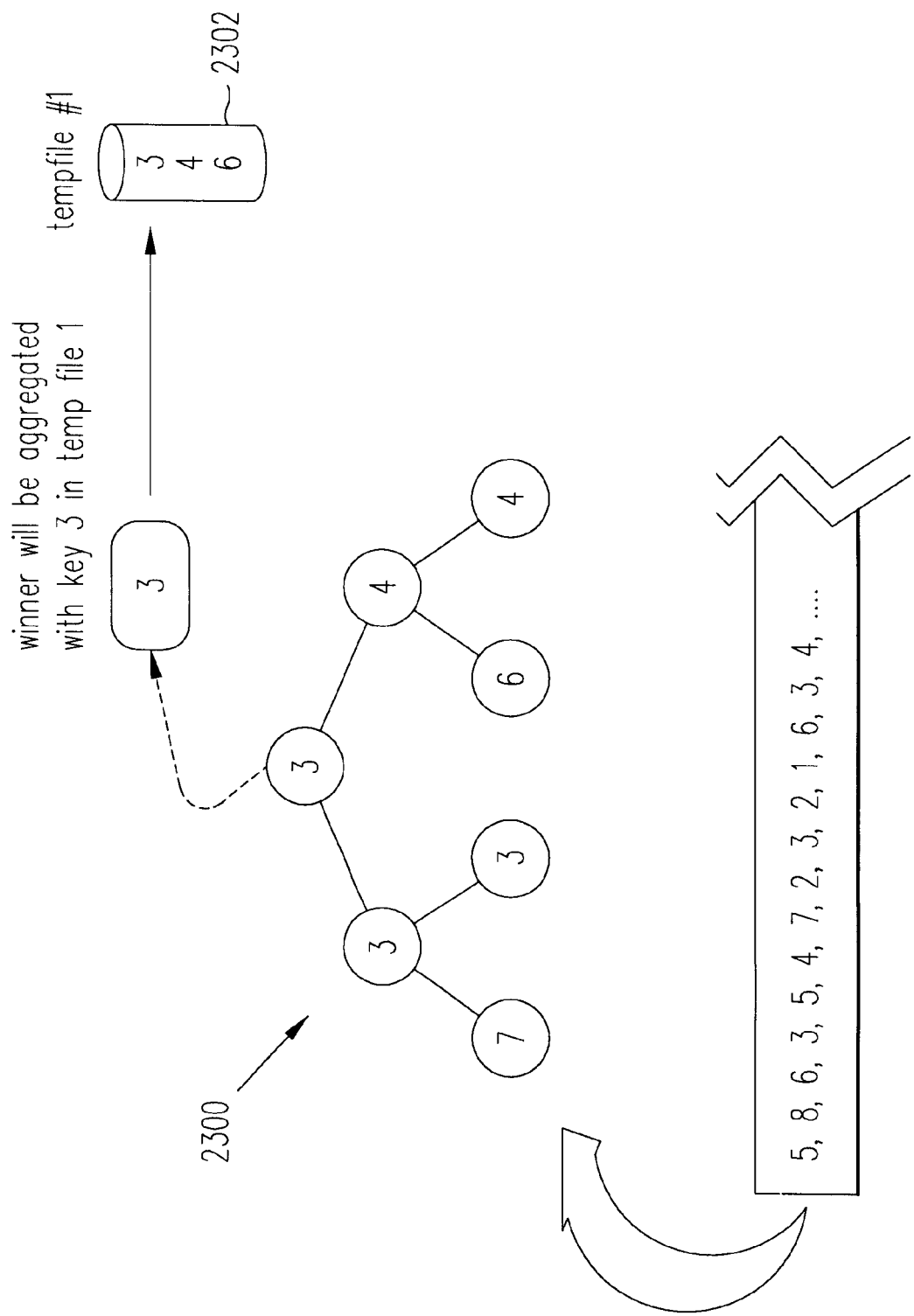
FIGS. 23A–23C are diagrams illustrating aggressive merging.
Figure 23B:
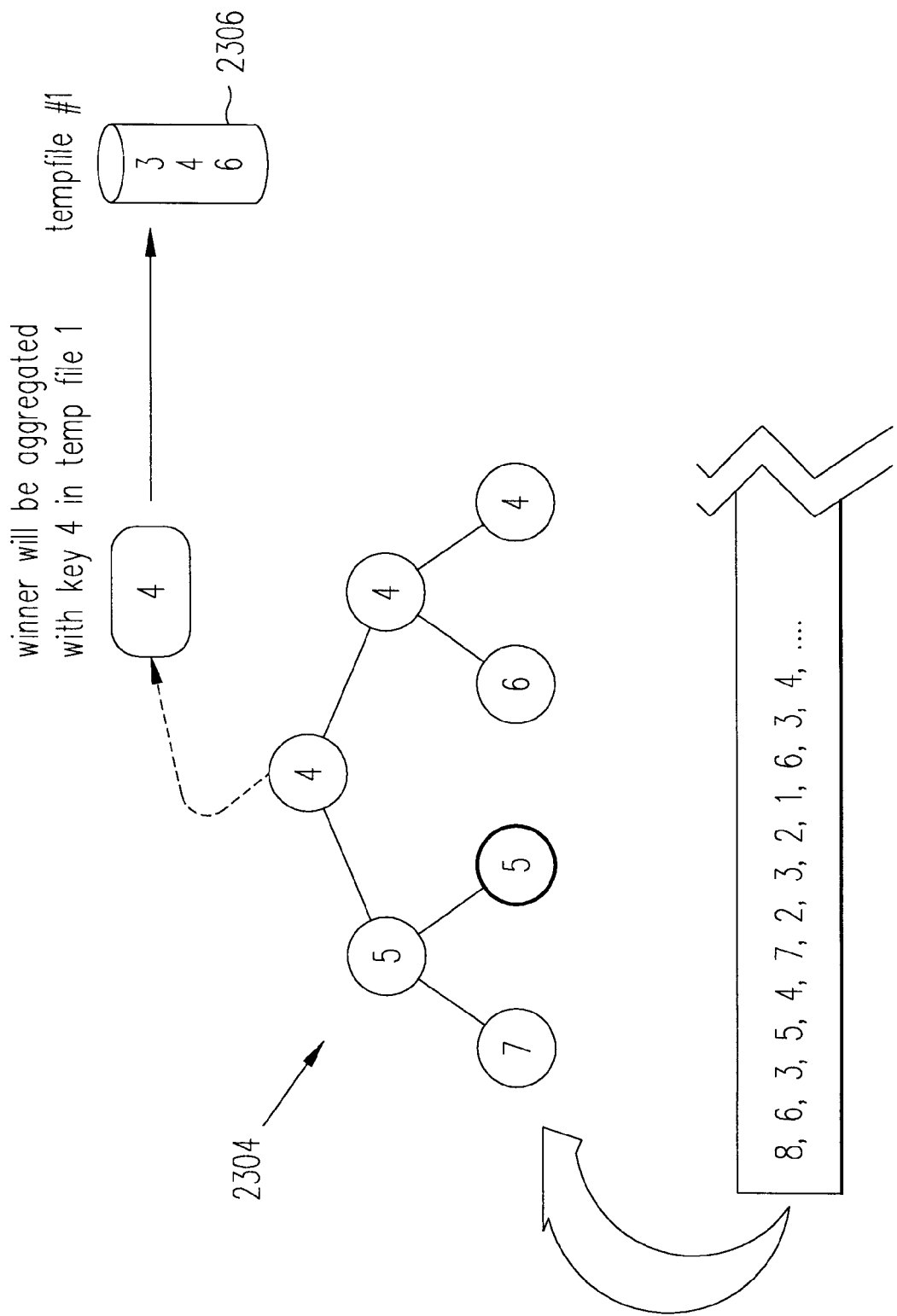
Figure 23C:
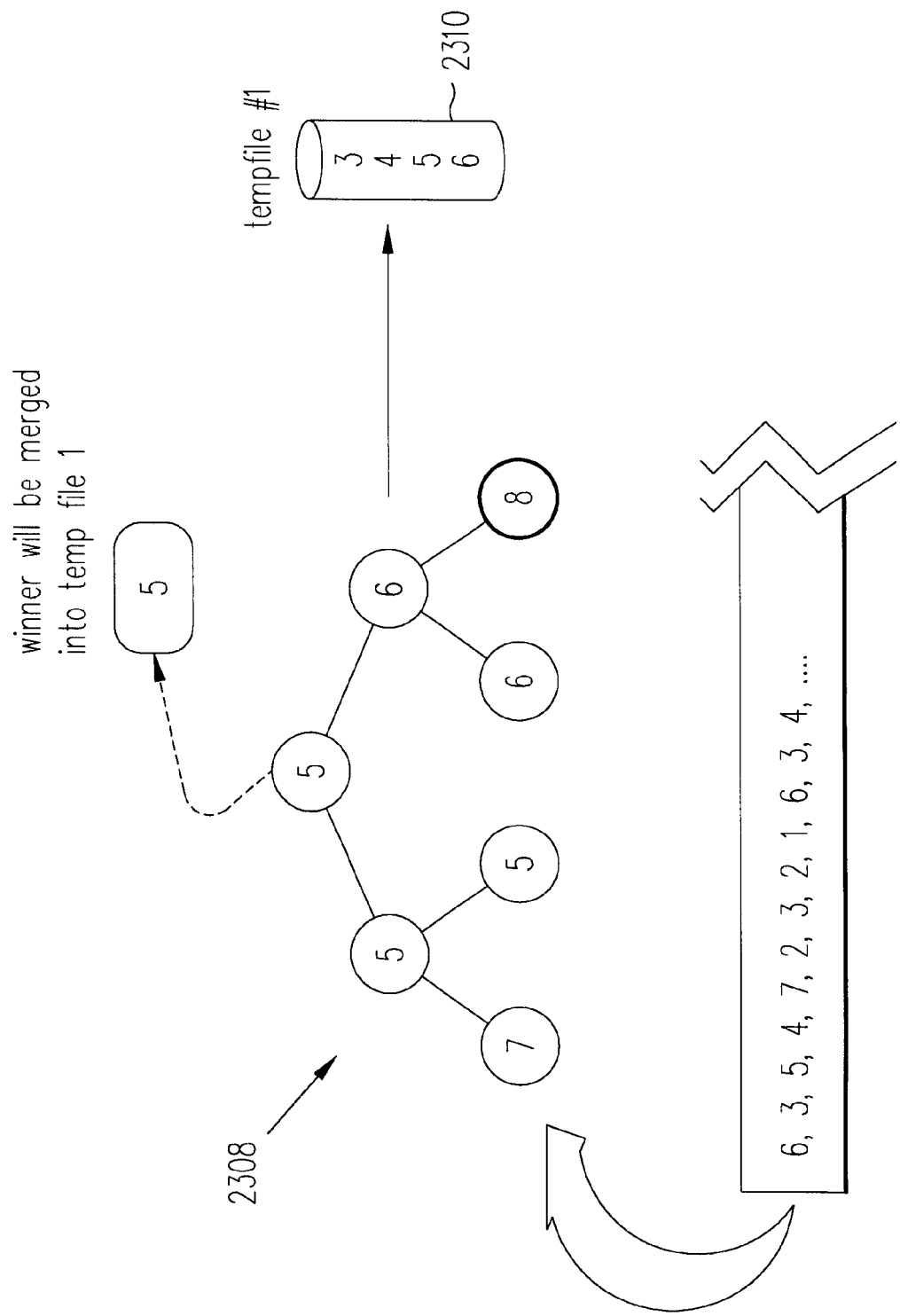

For aggressive merging, the first run is written out to the temporary data set along with accumulators. During the production of the second run, the second run is merged with the first run, as the rows of the second run emerge from the tree. FIGS. 23A–23C are diagrams illustrating aggressive merging. In FIG. 23A, the second run from tournament tree 2300 is merged with the first run in the temporary data set 2302.

Identical keys are aggregated in the temporary data set. For example, the winning key (3) is aggregated with key (3) in the temporary data set 2302. Also, since the winning key (3) is less than the last key added to the temporary data set 2302, which is key (6), a second run is started. In FIG. 23B, the winning key (4) from tournament tree 2304 is aggregated with key (4) in the temporary data set 2306. In FIG. 23C, the winning key (5) from the tournament tree 2308 is merged into the temporary data set 2310. Additionally, non-identical keys are merged with existing keys in the temporary data set 2310.

Figure 24:
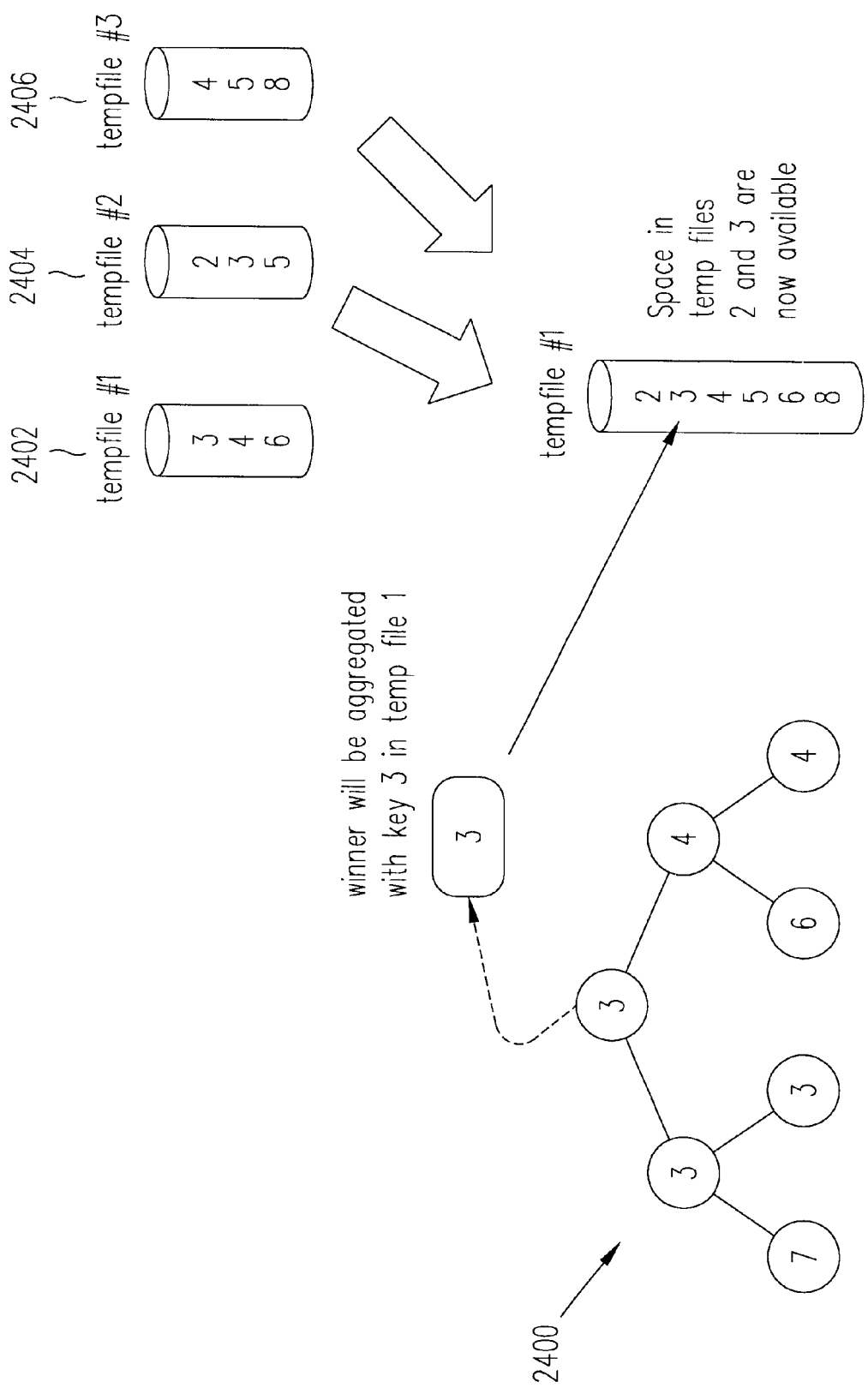
FIG. 24 is a diagram illustrating early merging.

During an early merge, aggregates for identical keys may be combined when the groupby aggregation system 124 finds a match. FIG. 24 is a diagram illustrating early merging. As a new run starts for tournament tree 2400, the temporary data sets 2402, 2404, and 2406 are merged and a new winner is aggregated.

Early merge is performed for every run. In fact, if there are no keys in a run that have not occurred in previous runs, the new records for the merged run can overwrite records of the old run. It is also possible to reuse the data set containing the old run, in spite of new keys occurring in a fresh run, if appropriate free space was left on data set pages to insert records for new keys in the pages that they should appear on. In practice, early merging works well when the database buffer pool is able to buffer almost all of the run in main memory, avoiding any spill-over to disk. The CPU cost of temporary data set manipulation during the multiple merges is the price paid.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented groupby aggregation system. The present invention provides a technique for efficient groupby aggregation in a tournament tree sort. The present invention also minimizes the need to write data to temporary data sets.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing groupby aggregation when executing a statement in a database stored on a data storage device connected to a computer, the method comprising the steps of:

inputting data elements into a tournament tree from an input sequence;

identifying a winner of a tournament in the tournament tree; and recycling the winner into the tournament tree.

2. The method of claim 1, wherein the step of recycling further comprises the step of recycling the winner when the data element from the input sequence cannot be part of the tournament in the tournament tree.

3. The method of claim 1, further comprising the step of terminating recycling when a number of distinct data elements in the tournament tree exceeds a number of leaf nodes in the tournament tree.

4. The method of claim 1, further comprising the step of terminating recycling when a number of aggregations between successive rounds of recycling falls below a certain threshold.

5. The method of claim 1, further comprising the step of performing winner aggregation.

6. The method of claim 1, further comprising the step of performing early aggregation.

7. The method of claim 1, further comprising the step of screening data elements input into the tournament tree with a bucket sort.

8. The method of claim I, further comprising the step of performing aggressive merging.

9. The method of claim 1, further comprising the step of performing early merging.

10. The method of claim 1, wherein the step of identifying the winner further comprises comparing values of nodes of the tournament tree based on an order.

11. An apparatus for performing groupby aggregation when executing a statement, comprising:

a computer having a data storage device connected thereto, wherein the data storage device stores a database in which the statement is executed;

one or more computer programs, performed by the computer, for inputting data elements into a tournament tree from an input sequence, identifying a winner of a tournament in the tournament tree, and recycling the winner into the tournament tree.

12. The apparatus of claim 11, wherein the means for recycling further comprises the means for recycling the winner when the data element from the input sequence cannot be part of the tournament in the tournament tree.

13. The apparatus of claim 11, further comprising the means for terminating recycling when a number of distinct data elements in the tournament tree exceeds a number of leaf nodes in the tournament tree.

14. The apparatus of claim 11, further comprising the means for terminating recycling when a number of aggregations between successive rounds of recycling falls below a certain threshold.

15. The apparatus of claim 11, further comprising the means for performing winner aggregation.

16. The apparatus of claim 11, further comprising the means for performing early aggregation.

17. The apparatus of claim 11, further comprising means for screening data elements input into the tournament tree with a bucket sort.

18. The apparatus of claim 11, further comprising the means for performing aggressive merging.

19. The apparatus of claim 11, further comprising the means for performing early merging.

20. The apparatus of claim 11, wherein identifying the winner further comprises comparing values of nodes of the tournament tree based on an order.

21. An article of manufacture comprising a computer program carrier readable by a computer and embodying one or more instructions executable by the computer to perform method steps for performing groupby aggregation when executing a statement in a database stored on a data storage device connected to a computer, the method comprising the steps of:

inputting data elements into a tournament tree from an input sequence;

identifying a winner of a tournament in the tournament tree; and recycling the winner into the tournament tree.

22. The article of manufacture of claim 21, wherein the step of recycling further comprises the step of recycling the winner when the data element from the input sequence cannot be part of the tournament in the tournament tree.

23. The article of manufacture of claim 21, further comprising the step of terminating recycling when a number of distinct data elements in the tournament tree exceeds a number of leaf nodes in the tournament tree.

24. The article of manufacture of claim 21, further comprising the step of terminating recycling when a number of aggregations between successive rounds of recycling falls below a certain threshold.

25. The article of manufacture of claim 21, further comprising the step of performing winner aggregation.

26. The article of manufacture of claim 21, further comprising the step of performing early aggregation.

27. The article of manufacture of claim 21, further comprising the step of screening data elements input into the tournament tree with a bucket sort.

28. The article of manufacture of claim 21, further comprising the step of performing aggressive merging.

29. The article of manufacture of claim 21, further comprising the step of performing early merging.

30. The article of manufacture of claim 21, wherein the step of identifying further comprises comparing values of nodes of the tournament tree based on an order.

* * * * *